(12) United States Patent
Kaneki

(10) Patent No.: US 10,061,109 B2
(45) Date of Patent: Aug. 28, 2018

(54) MICROSCOPE SYSTEM, METHOD FOR CONTROLLING MICROSCOPE SYSTEM, AND COMPUTER-READABLE RECORDING MEDIUM

(71) Applicant: OLYMPUS CORPORATION, Hachioji-shi, Tokyo (JP)

(72) Inventor: Shinsuke Kaneki, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/234,434

(22) Filed: Aug. 11, 2016

(65) Prior Publication Data

US 2017/0059842 A1 Mar. 2, 2017

(30) Foreign Application Priority Data

Aug. 28, 2015 (JP) .................. 2015-169200

(51) Int. Cl.
| | |
|---|---|
| *G02B 21/00* | (2006.01) |
| *G02B 21/24* | (2006.01) |
| *G02B 7/28* | (2006.01) |
| *G02B 27/14* | (2006.01) |
| *G02B 21/02* | (2006.01) |
| *G02B 21/04* | (2006.01) |
| *G02B 21/26* | (2006.01) |

(52) U.S. Cl.
CPC ............ *G02B 21/245* (2013.01); *G02B 7/28* (2013.01); *G02B 27/141* (2013.01); *G02B 21/025* (2013.01); *G02B 21/04* (2013.01); *G02B 21/241* (2013.01); *G02B 21/248* (2013.01); *G02B 21/26* (2013.01)

(58) Field of Classification Search
CPC .. G02B 21/025; G02B 21/241; G02B 21/245; G02B 21/26
USPC ................ 359/379, 380, 383, 392
See application file for complete search history.

(56) References Cited

U.S. PATENT DOCUMENTS

| | | | | |
|---|---|---|---|---|
| 4,422,735 A | * | 12/1983 | Shimizu ................. | A61B 3/14 351/206 |
| 4,744,642 A | * | 5/1988 | Yoshinaga ............. | G02B 21/24 359/379 |

(Continued)

FOREIGN PATENT DOCUMENTS

JP 2010152409 A 7/2010

*Primary Examiner* — Nicholas R Pasko
(74) *Attorney, Agent, or Firm* — Holtz, Holtz & Volek PC

(57) ABSTRACT

A microscope system includes: a microscope main body including an objective lens arranged in such a manner that an optical axis of the objective lens is aligned with an observation light path of the microscope main body; and an automatic focus unit including a light source, a dichroic mirror arranged so as to be inserted on or to be deviated from the observation light path and configured to reflect light emitted from the light source in a direction of the optical axis of the objective lens, and a dichroic mirror moving mechanism. The microscope main body further includes a controller having a dichroic mirror movement control unit configured to control the dichroic mirror moving mechanism to move the dichroic mirror to an arrangement position of the dichroic mirror on the observation light path, the arrangement position being correlated to the objective lens in advance.

7 Claims, 28 Drawing Sheets

(56) References Cited

U.S. PATENT DOCUMENTS

| | | | | |
|---|---|---|---|---|
| 6,746,121 B2* | 6/2004 | Ross | ............... | A61B 3/1015 |
| | | | | 351/212 |
| 7,031,071 B2* | 4/2006 | Nishioka | ............ | G02B 7/102 |
| | | | | 359/676 |
| 7,542,202 B2* | 6/2009 | Hashimoto | ......... | G02B 21/241 |
| | | | | 359/380 |
| 8,488,238 B2* | 7/2013 | Stanley | ............ | G02B 21/16 |
| | | | | 359/368 |
| 8,808,279 B2* | 8/2014 | Muhloff | ............ | A61F 9/008 |
| | | | | 606/4 |
| 2008/0204865 A1* | 8/2008 | Yoneyama | ......... | G02B 21/16 |
| | | | | 359/381 |
| 2012/0320453 A1* | 12/2012 | Kaneki | ............ | G02B 21/082 |
| | | | | 359/379 |
| 2014/0094711 A1* | 4/2014 | Sondermann | ...... | A61F 9/00825 |
| | | | | 600/558 |

* cited by examiner

FIG.29

| OBJECTIVE LENS | OFFSET LENS MOVING RANGE [mm] | OFFSET LENS MOVING STEP [mm] |
|---|---|---|
| OBJECTIVE LENS 3a | 1.0 TO 4.0 | 1.0 |
| OBJECTIVE LENS 3b | 10.0 TO 16.0 | 2.0 |
| OBJECTIVE LENS 3c | 5.0 TO 20.0 | 5.0 |

OFFSET LENS MINIMUM POSITION

OFFSET LENS CENTER POSITION

OFFSET LENS MAXIMUM POSITION

MICROSCOPE SYSTEM, METHOD FOR CONTROLLING MICROSCOPE SYSTEM, AND COMPUTER-READABLE RECORDING MEDIUM

CROSS REFERENCES TO RELATED APPLICATIONS

This application is based upon and claims the benefit of priority from Japanese Patent Application No. 2015-169200, filed on Aug. 28, 2015, the entire contents of which are incorporated herein by reference.

BACKGROUND

1. Technical Field

The disclosure relates to a microscope system including a microscope main body and an automatic focus unit, a method for controlling the microscope system, and a computer-readable recording medium.

2. Related Art

In the related arts, a microscope for illuminating and observing a specimen is used for observing cells and the like in the fields of medicine and biology. Also, in the industrial field, a microscope is used for various kinds of purposes such as quality control for a metallic composition and the like, research and development for new material, and inspection of an electronic device and a magnetic head.

As an automatic focus (AF) processing of the microscope, there is a known technology in which a sample including a specimen is irradiated with infrared light different from visible light used for irradiation at the time of normal observation, reflection light reflected from an interface having a refractive index, difference is detected, and determination is made on whether focusing is achieved by using an AF signal based on intensity of the detected reflection light. In the AF processing, the infrared light is emitted while changing a position of focusing portion such as a stage that moves in a vertical direction (Z-direction) in accordance with electric control (hereinafter referred to as Z-position).

For example, as a microscope system performing the AF processing, there is a proposed structure in which an AF unit is formed as a separate body from a microscope main body, and a dichroic mirror (DM) is mounted in order to introduce infrared light for AF processing emitted from the AF unit to an objective lens of the microscope main body (refer to JP-A-2010-152409, for example). In this structure, the DM is inserted on an observation light path at the time of the AF processing, and the DM is deviated from the observation light path, thereby preventing optical characteristics of the DM from affecting an observation optical system at the time of normal observation.

SUMMARY

In some embodiments, a microscope system includes a microscope main body and an automatic focus unit. The microscope main body includes: an objective lens arranged in such a manner that an optical axis of the objective lens is aligned with an observation light path of the microscope main body; a stage for holing an observation object; and a focusing drive unit configured to move at least one of the stage and the objective lens in a direction along the observation light path. The automatic focus unit includes: a light source configured to emit detection light having non-visible light component for automatic focus processing; a dichroic mirror arranged so as to be inserted on or to be deviated from the observation light path and configured to reflect the detection light emitted from the light source in a direction of the optical axis of the objective lens while transmitting visible light; a dichroic mirror moving mechanism configured to move a position of the dichroic mirror; and a detection light receiving unit configured to receive the detection light reflected from the observation object via the objective lens. The microscope main body further includes a controller having: a dichroic mirror movement control unit configured to control the dichroic mirror moving mechanism to move the dichroic mirror to an arrangement position of the dichroic mirror on the observation light path, the arrangement position being correlated to the objective lens in advance; and a focusing drive control unit configured to control the focusing drive unit so as to focus on the observation object based on a result of light reception by the detection light receiving unit.

In some embodiments, a method for controlling a microscope system includes: identifying an objective lens arranged in such a manner that an optical axis of the objective lens is aligned with an observation light path; reading, from a storage unit, an arrangement position of a dichroic mirror on the observation light path, the arrangement position being correlated to the identified objective lens in advance; and controlling a dichroic mirror moving mechanism to move the dichroic mirror to the arrangement position.

In some embodiments, a non-transitory computer-readable recording medium with an executable program stored thereon is provided. The program instructs a processor to execute: identifying an objective lens arranged in such a manner that an optical axis of the objective lens is aligned with an observation light path; reading, from a storage unit, an arrangement position of a dichroic mirror on the observation light path, the arrangement position being correlated to the identified objective lens in advance; and controlling a dichroic mirror moving mechanism to move the dichroic mirror to the arrangement position.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 29 is a diagram illustrating exemplary data stored by an offset lens moving range storage unit illustrated in FIG. 28;

DETAILED DESCRIPTION

Figure 1:
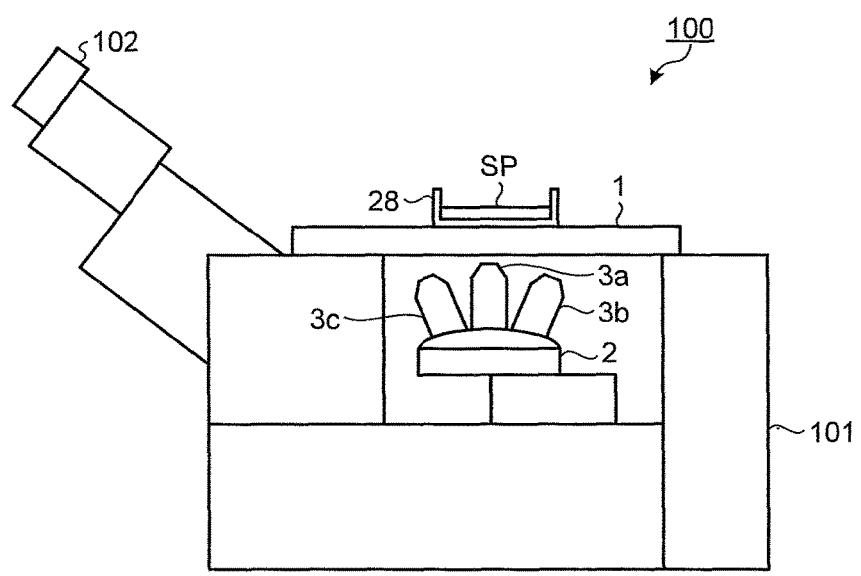
FIG. 1 is a schematic view illustrating an entire outline structure of a microscope system according to a first embodiment of the present invention.

In the following, modes for carrying out the present invention (hereinafter referred to as "embodiment(s)") will be described with reference to the drawings. Note that the present invention is not limited by the embodiments described below. In the drawings referenced in the following description, a shape, a size, and a positional relation are merely schematically illustrated to an extent necessary to understand the content of the present invention. In other words, the present invention is not limited only by the shape, size, and positional relation exemplified in the respective drawings. The same reference numerals are used to designate the same elements throughout the drawings.

First Embodiment

FIG. 1 is a schematic view illustrating an entire outline structure of a microscope system according to a first embodiment of the present invention. A microscope system 100 illustrated in FIG. 1 is inverted, and includes a microscope main body 101 having a stage 1 and a revolver body 2, and an eyepiece 102 that magnifies an observation image incident via tube lens, a mirror, and the like. The eyepiece 102 is formed by using one or a plurality lenses. In the first embodiment, a description will be provided assuming that a specimen SP that is an observation object is contained in a dish 28 together with culture solution.

The stage 1 holds the dish 28 and is movable in an optical axis direction of an objective lens that is arranged in such a manner that an optical axis thereof is aligned with an observation light path. The revolver body 2 holds objective lenses 3a to 3c, and arranges one of the objective lenses with the optical axis aligned with the observation light path by performing self-rotational movement. Meanwhile, in the first embodiment, a description will be provided assuming that the objective lens 3a is an objective lens having a focus depth of intermediate NA (middle NA), the objective lens 3b is an objective lens having a focus depth of small NA (high NA), and the objective lens 3c is an objective lens having a focus depth of a large NA (low NA).

Figure 2:
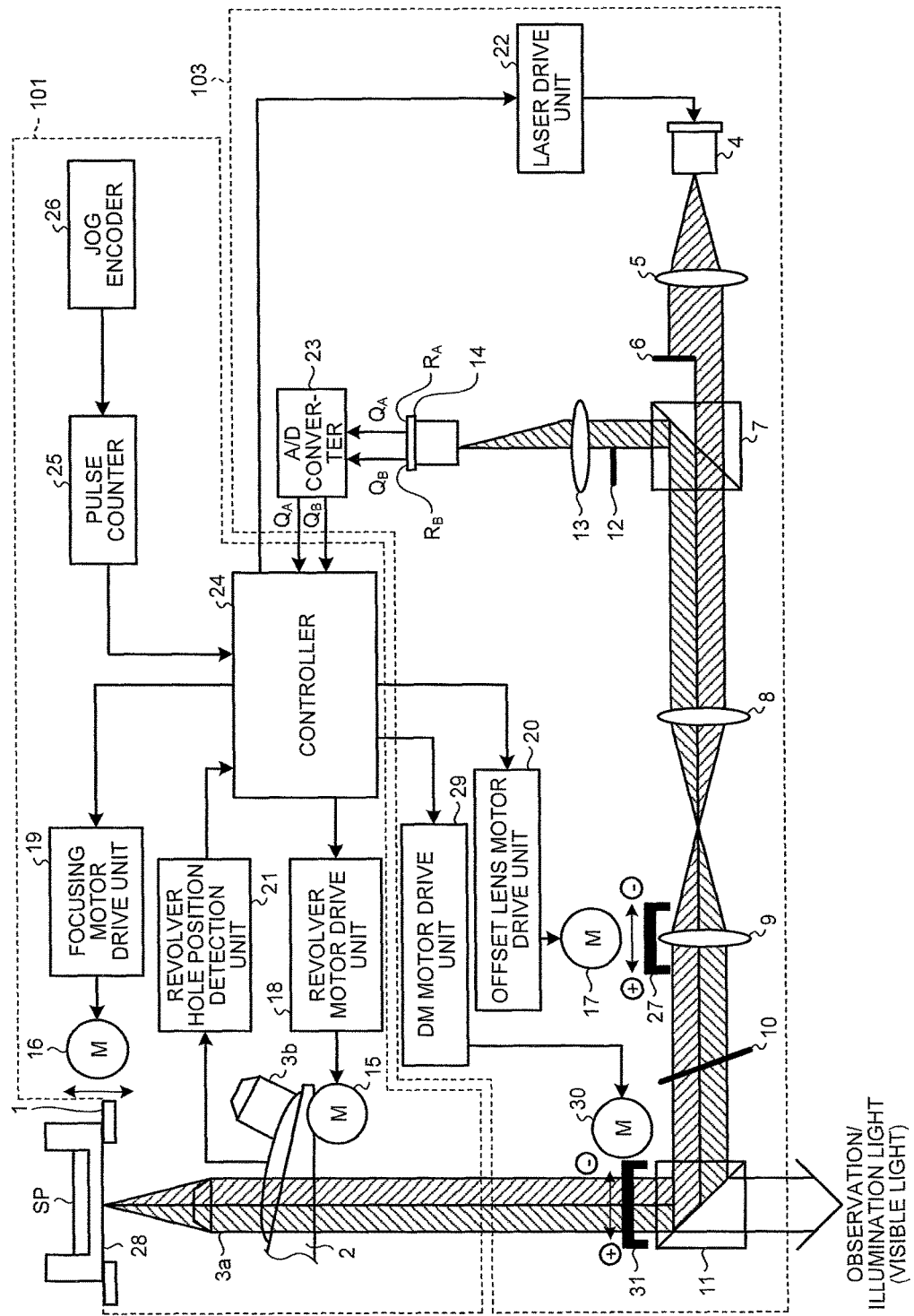
FIG. 2 is a schematic diagram illustrating a main configuration of the microscope system according to the first embodiment.

An automatic focus (AF) mechanism in the microscope system 100 will be described with reference to FIG. 2. The AF mechanism is a mechanism to automatically focus a focal point on the specimen SP. FIG. 2 is a schematic diagram illustrating a main configuration of the microscope system 100 according to the first embodiment. As illustrated in FIG. 2, in the microscope system 100, the microscope main body 101 and an automatic focus (AF) unit 103 are separate bodies, and AF processing is executed with the AF unit 103 attached to the microscope main body 101. Also, in FIG. 2, the objective lens 3a is arranged in such a manner that the optical axis is aligned with the observation light path.

The AF unit 103 includes a reference light source 4, a collimator lens 5, a light projection side stopper 6, a polarization beam splitter (PBS) 7, a condenser lens group 8, an offset lens group 9, a λ/4 plate 10, a dichroic mirror (DM) 11, a light receiving side stopper 12, a condenser lens group 13, a two-segment photodiode (PD) 14, an offset lens motor 17, an offset lens motor drive unit 20, a laser drive unit 22, an A/D converter 23, an offset lens limit detection unit 27, a DM motor drive unit 29, a DM motor 30, and a DM limit detection unit 31.

The reference light source 4 is a light source used at the time of AF processing, and a light source of an invisible light field such as infrared light is used. The reference light source 4 is a laser diode (LD) that emits infrared laser light having a component of the invisible light as AF light (detection light) to perform AF by drive control of the laser drive unit 22. The reference light source 4 performs pulse lighting and the like, and is controlled by the laser drive unit 22 that controls a level of light emission intensity.

The collimator lens 5 is provided in order to keep collimated light. The light projection side stopper 6 cuts half of a luminous flux of the collimated light having passed through the collimator lens 5. The PBS 7 transmits the AF light and also reflects a polarized component of the AF light. The condenser lens group 8 condenses once the luminous flux of the light having passed through the PBS 7 and also transmits light having passed through the offset lens group 9.

The offset lens group 9 is provided between the reference light source 4 and the DM 11. The offset lens group 9 has a structure including both a zooming mechanism to change a focal length by the offset lens motor 17 and a mechanism to perform movement in an optical axis direction of the AF light, and is adjusted by drive of the offset lens motor 17 executed by the offset lens motor drive unit 20. Furthermore, the offset lens limit detection unit 27 is provided at both ends of a predetermined range in the optical axis direction of the AF light of the offset lens group 9, and restricts a moving range in the optical axis direction of the offset lens group 9. In the example of FIG. 2, the offset lens group 9 is moved, setting a left direction of the drawing as a positive direction and setting a right direction of the drawing as a negative direction.

The λ/4 plate 10 changes linear polarized light to elliptical polarized light or circular polarized light, and changes the elliptical polarized light or circular polarized light to the linear polarized light.

The DM 11 reflects light in an infrared range and transmits light in a visible range. The DM 11 reflects the AF light. The DM 11 is inserted on the observation light path at the time of AF processing. In this case, the DM 11 transmits the visible light while reflecting the AF light emitted from the reference light source 4 in a direction of the optical axis of the objective lens 3a arranged in such a manner that the optical axis is aligned with the observation light path. Since the DM 11 transmits the visible light, the visible light used for observing the specimen SP, namely, observation light and illumination light reach the eyepiece 102 via the objective lens inserted on the observation light path, and enables observation of the specimen SP. At the time of normal observation, the DM 11 is deviated from the observation light path such that the DM 11 does not affect an observation optical system. The DM 11 has a structure movable by the DM motor 30 in an inserting direction of the DM 11 into the observation light path, and the position thereof is changed by drive of the DM motor 30 executed performed by the DM motor drive unit 29. The DM motor drive unit 29 and the DM motor 30 are DM moving mechanisms. Furthermore, the DM limit detection unit 31 is provided at both end portions of a predetermined range in the inserting direction of the DM 11 into the observation light path, and restricts a moving range of the DM 11, In FIG. 2, the DM 11 is movable in the positive direction (left direction in the figure) and in the negative direction (right direction in the figure).

The light receiving side stopper 12 cuts half of a luminous flux of light of the polarized component of the AF light reflected by the PBS 7. The condenser lens group 13 condenses the light of the polarized component of the AF light reflected by the PBS 7 to the two-segment PD 14.

The two-segment PD 14 is a photo-detector implemented by a photodiode having two light receiving segments (first segment $R_A$ and second segment $R_B$) divided by an optical axis. The two-segment PD 14 receives the AF light reflected from the observation object via a detection light path including the objective lens, the DM 11, and offset lens group 9. A current signal corresponding to light intensity at a spot where an image is formed at the two-segment PD 14 is amplified with a predetermined amplification factor after conversion of current/voltage, and then arithmetic processing is performed in a controller 24 after the signal is converted to a digital value at the A/D converter 23.

The microscope main body 101 includes a revolver motor 15, a focusing motor 16, a revolver motor drive unit 18, a focusing motor drive unit 19, a revolver hole position detection unit 21, the controller 24, a pulse counter 25, and a JOG encoder 26.

The revolver motor 15 performs electric drive in order to rotate the revolver body 2 and insert one of the objective lens (any one of objective lenses 3a to 3c) into the light path under control of the revolver motor drive unit 18.

The focusing motor 16 moves, as a focusing portion, the stage 1 loaded with the specimen SP (dish 28) to be an observation object in a direction (Z-direction) along the observation light path under control of the focusing motor drive unit 19.

The revolver hole position detection unit 21 detects which one of objective lens setting positions of the revolver body 2 is currently inserted on the light path. The revolver hole position detection unit 21 is formed by using, for example, a magnetic sensor, an optical sensor, a button, and the like.

In such an electric revolver, the revolver motor 15 is rotationally driven by drive of the revolver motor drive unit 18 that receives a signal from the controller 24, and information detected by the revolver hole position detection unit 21 is transmitted to the controller 24. The revolver hole position detection unit 21 detects which hole of the revolver body 2 the objective lens is attached to.

Furthermore, as operating units directly operated by an observer, provided are an objective lens change switch to change the objective lens to be arranged on the light path by rotating the revolver body 2, an AF switch set/cancel AF operation, and the JOG encoder 26 to provide a command for vertical movement of the stage 1 and movement of the offset lens group 9. An encoder signal from the JOG encoder 26 is converted to a pulse number at the pulse counter 25 and transmitted to the controller 24. The controller 24 determines in which direction and how many times the JOG encoder 26 is rotated by reading the pulse number from the pulse counter 25, and operates respective drive units in accordance with a rotation amount of the JOG encoder 26.

The controller 24 is a known central processing unit (CPU) circuit, formed of a known peripheral circuits such as a CPU body, a ROM to store a control program, a RAM that is a volatile memory to timely store necessary data for control, an I/O port to perform input and output of control signals, a data bus to connect the respective units, an oscillator, and an address decoder, and the controller 24 controls peripheral devices via the data bus and the I/O port.

Figure 3:
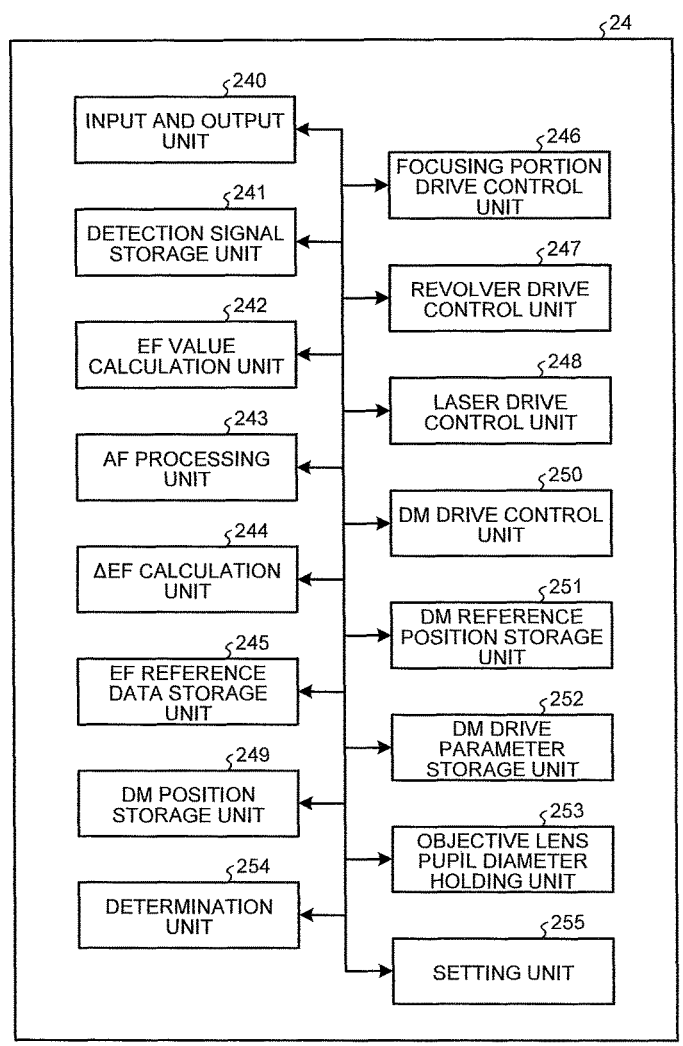
FIG. 3 is a block diagram illustrating an internal configuration of a control unit illustrated in FIG. 2.

FIG. 3 is a block diagram illustrating a configuration of a main portion of a microscope device according to the first embodiment and also is a block diagram illustrating an internal configuration of the controller 24. The controller 24 includes an input and output unit 240, a detection signal storage unit 241, an EF value calculation unit 242, an AF processing unit 243, a ΔEF calculation unit 244, an EF reference data storage unit 245, a focusing portion drive control unit 246, a revolver drive control unit 247, a laser drive control unit 248, a DM position storage unit 249, a DM drive control unit 250 (dichroic mirror movement control unit), a DM reference position storage unit 251, a DM drive parameter storage unit 252, an objective lens pupil diameter holding unit 253, a determination unit 254, and a setting unit 255. The respective storage units may be implemented by, for example, a semiconductor memory such as flash memory and a dynamic random access memory (DRAM), each of the storage units may be formed of an individual memory, or all of those may be formed of one memory.

The input and output unit 240 receives: a detection value of the two-segment PD 14, which has been converted to a digital value at the A/D converter 23; an encoder signal from the JOG encoder 26, which has been converted to a pulse number at the pulse counter 25; or the objective lens setting position of the revolver body 2, which is currently inserted on the light path. The input and output unit 240 outputs drive signals to the respective drive units in order to drive the revolver motor drive unit 18, focusing motor drive unit 19, offset lens motor drive unit 20, laser drive unit 22, and DM motor drive unit 29.

The detection signal storage unit 241 stores the detection value of the two-segment PD 14 after the detection value is converted to the digital value at the A/D converter 23. The EF value calculation unit 242 calculates an EF value in the focus depth area on the optical axis of the objective lens arranged on the observation light path based on the detection value of the two-segment PD 14 stored in the detection signal storage unit 241. The AF processing unit 243 executes AF processing described later by using the EF value in the focus depth area calculated in the EF value calculation unit 242, and AF processing for obtaining an arrangement position of the DM 11 on the observation light path illustrated in FIG. 20.

The ΔEF calculation unit 244 calculates a slope ΔEF' value of the EF value in the focus depth area relative to the optical axis of the objective lens.

The EF reference data storage unit 245 stores, per objective lens, a slope reference value of the EF value relative to the Z-axis in the focus depth area on the optical axis of the objective lens.

The focusing portion drive control unit 246 commands the focusing motor drive unit 19 to drive the focusing motor 16. In the microscope main body 101 of the first embodiment, the focusing motor 16 and the focusing motor drive unit 19 are provided to move the stage 1 as the focusing portion in the Z-direction along the observation light path. However, the microscope main body 101 may includes a motor and a motor drive unit to vertically move the objective lens arranged on the observation light path. This structure makes it possible to move, in the Z-direction along the observation light path, the objective lens arranged in such a manner that the optical axis is aligned with the observation light path. In this case, the focusing portion drive control unit 246 commands the motor drive unit of the motor to drive the motor in order to vertically move the objective lens arranged on the observation light path.

The revolver drive control unit 247 sends a command to drive the electric revolver. The laser drive control unit 248 commands the laser drive unit 22 to drive the reference light source 4.

Figure 4:
FIG. 4 is a diagram illustrating exemplary DM positional data held by a DM position storage unit illustrated in FIG. 3.

The DM position storage unit 249 stores DM positional data that is data related to the arrangement position of the DM 11 on the observation light path which is correlated to each of the objective lenses in advance. The arrangement position of the DM 11 on the observation light path is an inserting position of the DM 11 on the observation light path at the time of AF processing. The arrangement position of the DM 11 on the observation light path correlated to each of the objective lenses is obtained by preliminarily performing, for each of the objective lenses, adjustment processing for obtaining the DM position such that a light path of the AF light of the AF unit 103 is aligned with an optical axis of the microscope main body 101. FIG. 4 is a diagram illustrating exemplary DM positional data held by the DM position storage unit 249. As illustrated in a table T0, the DM position storage unit 249 stores data in which each of the objective lenses 3a to 3c is correlated to each correction value relative to a reference position of the inserting position of the DM 11 into the observation light path correlated to each of the objective lenses 3a to 3c.

The DM drive control unit 250 commands the DM motor drive unit 29 to drive the DM motor 30 in order to move the DM 11. At the time of AF processing, the DM drive control unit 250 causes the DM motor drive unit 29 and the DM motor 30 to move the DM 11 to the arrangement position of the DM 11 on the observation light path that is preliminarily correlated to the objective lens arranged in such a manner that the optical axis is aligned with the observation light path. From among the respective reference positions stored by the DM reference position storage unit 251 described later and the respective correction values stored in the DM position storage unit 249, the DM drive control unit 250 obtains a reference position of the DM 11 and a correction value of the DM 11 correlated to the objective lens arranged in such a manner that the optical axis is actually aligned with the observation light path, and commands the DM motor drive unit 29 to drive the DM motor 30 to move the DM 11 to a position moved from the reference position by an amount of the correction value.

The DM reference position storage unit 251 stores a predetermined reference position of the DM 11 for each of the objective lenses. The DM drive parameter storage unit 252 stores various kinds of parameters used in the adjustment processing for obtaining the DM position.

Figure 5:
FIG. 5 is a diagram illustrating exemplary data held by an objective lens pupil diameter holding unit illustrated in FIG. 3.

The objective lens pupil diameter holding unit 253 stores a pupil diameter of each of the objective lenses correlated to each of the objective lenses. FIG. 5 is a diagram illustrating exemplary data held by the objective lens pupil diameter holding unit 253. As illustrated in a table T1 of the FIG. 5, the objective lens pupil diameter holding unit 253 stores the data in which each of the objective lenses 3a to 3c is correlated to each of the pupil diameters of the objective lenses 3a to 3c.

The determination unit 254 determines whether the slope ΔEF' calculated by the ΔEF calculation unit 244 is equal to the reference value in the adjustment processing for obtaining the DM position. The controller 24 obtains, as the arrangement position of the DM 11 on the observation light path, the DM 11 position in which the determination unit 254 determines that the slope ΔEF' calculated by the ΔEF calculation unit 244 is equal to the reference value in the processing for obtaining the arrangement position of the DM 11 on the observation light path illustrated in FIG. 20 described later.

The setting unit 255 sets a moving direction of the DM 11 in the adjustment processing for obtaining the DM position based on a comparison between the reference value and the slope ΔEF' calculated by the ΔEF calculation unit 244 in accordance with a determination result of the determination unit 254.

Figure 6:
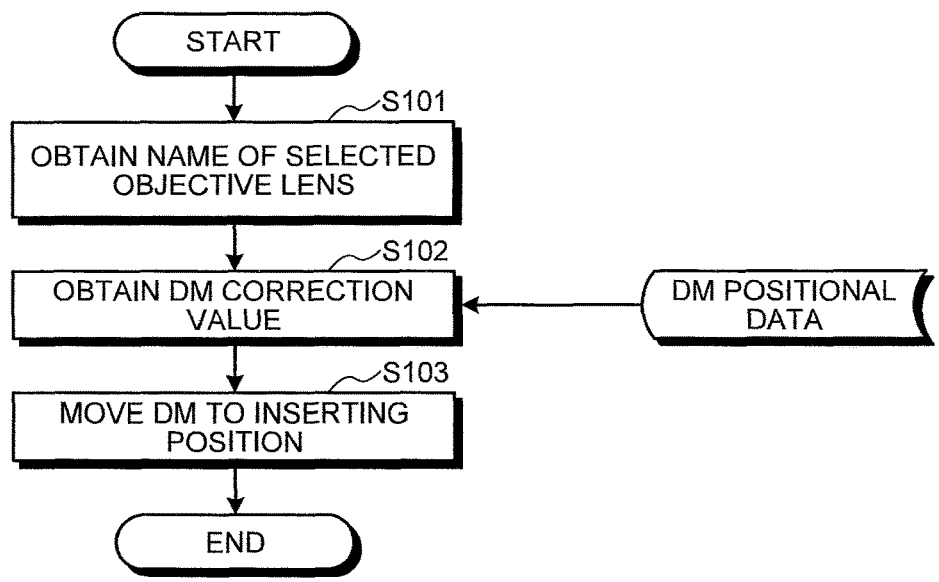
FIG. 6 is a flowchart illustrating a processing procedure of correction processing of an arrangement position of a DM on an observation light path executed by a DM drive control unit illustrated in FIG. 3.

In the first embodiment, before the AF processing, the arrangement position of the DM 11 on the observation light path is corrected so as to be the arrangement position according to the objective lens arranged in such a manner that the optical axis is aligned with the observation light path, thereby aligning the light path of the AF light in the AF unit 103 with the optical axis of the microscope main body 101. FIG. 6 is a flowchart illustrating a processing procedure of the correction processing of the arrangement position of the DM 11 on the observation light path performed by the DM drive control unit 250.

As illustrated in FIG. 6, first the DM drive control unit 250 obtains a name of the objective lens selected to be located on the observation light path based on a detection result of the revolver hole position detection unit 21 (Step S101), and performs processing to identify the objective lens arranged in such a manner that the optical axis is aligned with the observation light path. The DM drive control unit 250 reads the reference position of the DM 11 from the DM reference position storage unit 251, and also reads and obtain, from the DM positional data stored in the DM position storage unit 249, a correction value of an inserting position of the DM 11 correlated to the name of the objective lens obtained in Step S101 (Step S102). In other words, the DM drive control unit 250 reads, from the DM reference position storage unit 251 and the DM position storage unit 249, the arrangement position of the DM 11 on the observation light path correlated to the objective lens identified in Step S101. The DM drive control unit 250 causes the DM motor drive unit 29 and the DM motor 30 to move the DM 11 to the inserting position (arrangement position of the DM 11 on the observation light path) obtained by correcting the reference position obtained in Step S102 with the correction value (Step S103), and then finishes the processing.

Next, the AF processing will be described. Referring back to FIG. 2, in the AF unit 103, the infrared laser light as the AF light emitted from the reference light source 4 passes through the collimator lens 5, and is guided to the specimen SP side via the light projection side stopper 6. More specifically, the luminous flux once condensed by the condenser lens group 8 passes through the offset lens group 9, passes through the λ/4 plate 10, and is reflected by the DM 11. The DM drive control unit 250 performs the processing procedure of FIG. 6 before the AF processing, thereby placing the DM 11 on the corrected position that is preliminarily correlated to the objective lens arranged on the light path at the time of the AF processing.

The AF light reflected by the DM 11 forms a spot-like image on the specimen SP (or the dish 28) by the objective lens. Then, the AF light reflected by the specimen SP passes through the λ/4 plate 10 via the objective lens and the DM 11. After that, the AF light passes through the offset lens group 9 and the condenser lens group 8 and enters the PBS 7. A polarized component of the AF light reflected from the PBS 7 passes through the light receiving side stopper 12 and the condenser lens group 13, and then is focused onto the two-segment PD 14.

Figure 7:
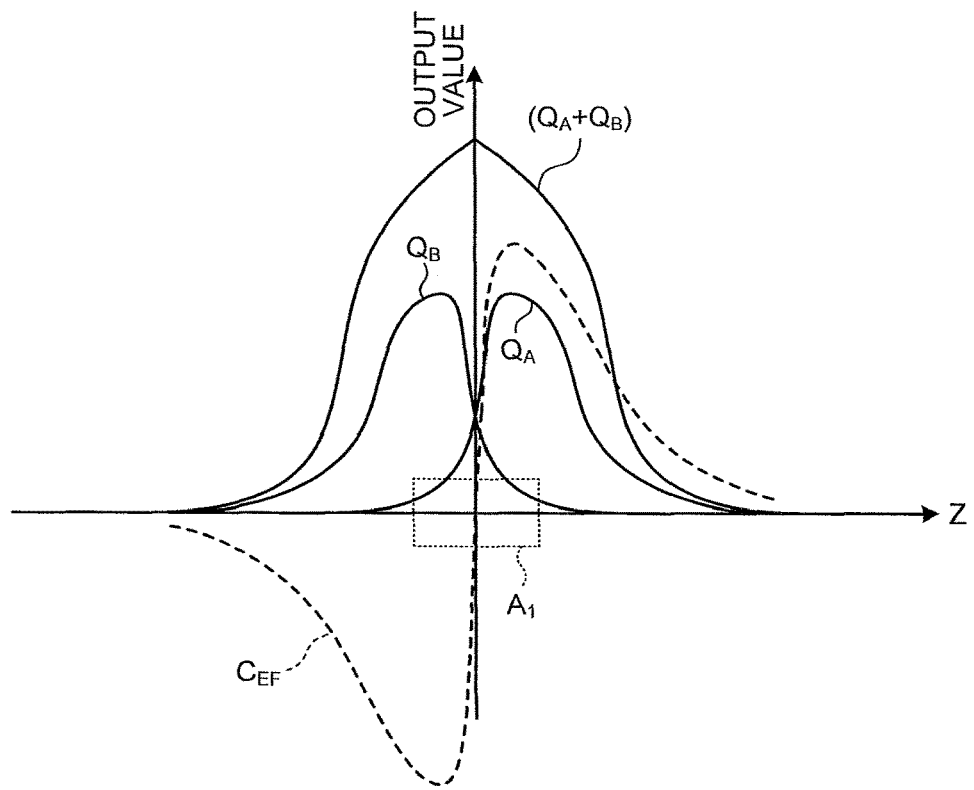
FIG. 7 is a diagram illustrating a Z-position dependence of signal intensity detected by a two-segment PD illustrated in FIG. 2.

FIG. 7 is a diagram illustrating a Z-position dependence of signal intensity detected by the two-segment PD 14 (for example, position of the stage 1 in the Z-direction). The Z-axis is an axis indicating a direction along the observation light path, and is parallel to the optical axis of the objective lens arranged in such a manner that the optical axis is aligned with the observation light path. The light receiving area of the two-segment PD 14 is divided into two segments by the optical axis of the reflection light (first segment $R_A$ and second segment $R_B$). In the two-segment PD 14, sensors correlated to the divided two segments detect light intensity of the respective segments as detection signals $Q_A$ and $Q_B$ (refer to FIG. 7). Then, the EF value calculation unit 242 calculates, as the EF value, a value $((Q_A-Q_B)/(Q_A+Q_B))$ obtained by dividing a difference therebetween $(Q_A-Q_B)$ by a sum thereof $(Q_A+Q_B)$ (refer to FIG. 7), and the AF processing unit 243 makes focus determination by using the EF value. A line $C_{EF}$ in FIG. 7 represents the Z-position dependence of the EF value. The controller 24 relatively changes a distance between the objective lens and the specimen SP, and determines, as an in-focus position, a Z position where the EF value can be deemed substantially zero.

Next, the AF processing executed by the microscope system 100 will be described. When the AF switch to set/cancel AF operation is pushed, the controller 24 provides the laser drive unit 22 with a signal to irradiate the specimen SP with a spot of the infrared light for AF, and starts oscillation of the reference light source 4.

The specimen SP is irradiated with the spot of the luminous flux from the reference light source 4, and the reflection light thereof is projected to the two-segment PD 14. Then, AF control is performed based on this projected spot position.

Figure 8A:
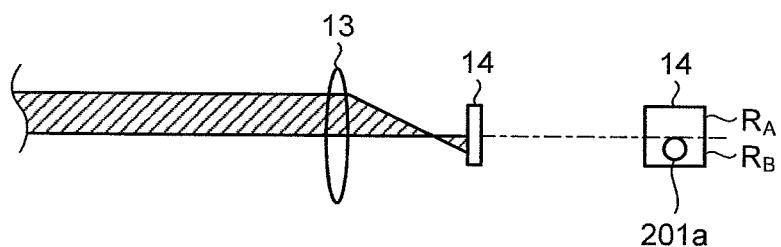
FIG. 8A is an explanatory view for a state of image formation on the two-segment PD according to the first embodiment.
Figure 8B:
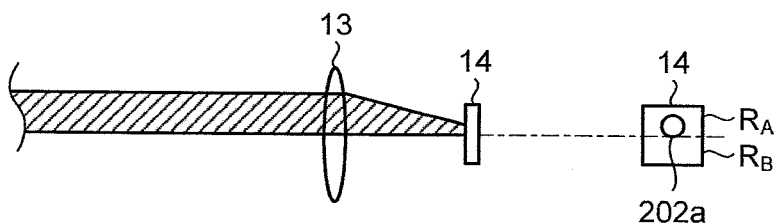
FIG. 8B is an explanatory view for the state of image formation on the two-segment PD according to the first embodiment.
Figure 8C:
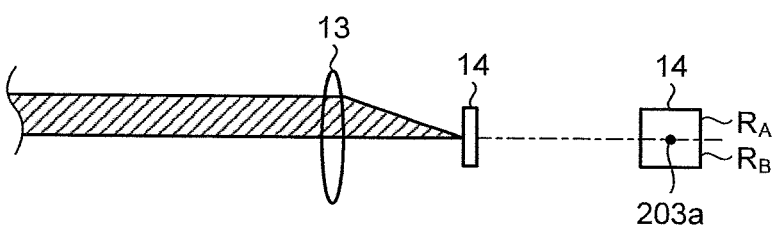
FIG. 8O is an explanatory view for the state of image formation on the two-segment PD according to the first embodiment.
Figure 9A:
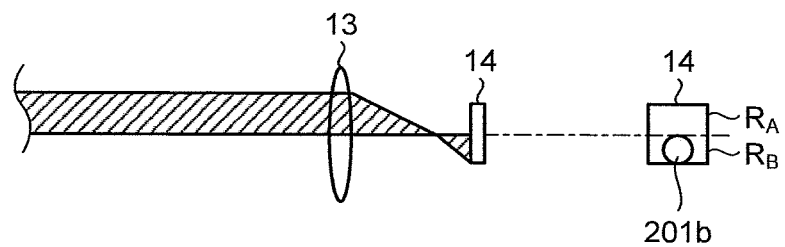
FIG. 9A is an explanatory view for the state of image formation on the two-segment PD according to the first embodiment.
Figure 9B:
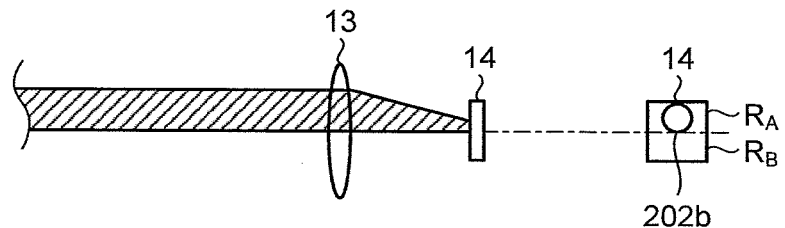
FIG. 9B is an explanatory view for the state of image formation on the two-segment PD according to the first embodiment.
Figure 9C:
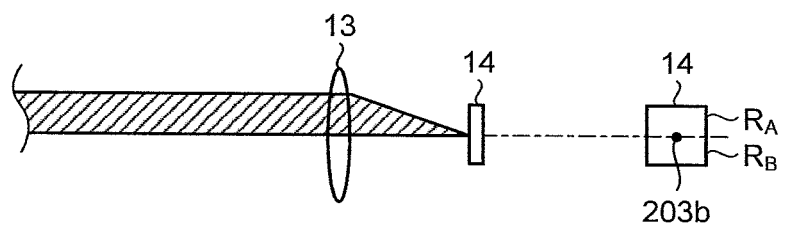
FIG. 9C is an explanatory view for the state of image formation on the two-segment PD according to the first embodiment.
Figure 10A:
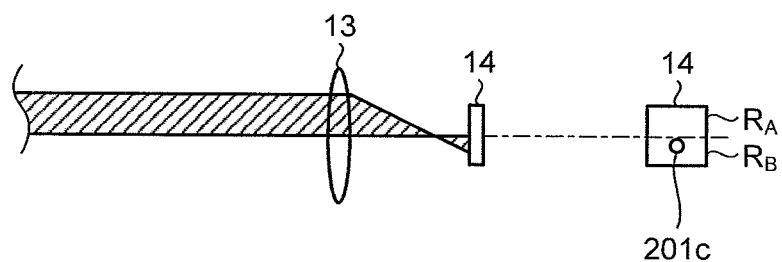
FIG. 10A is an explanatory view for the state of image formation on the two-segment PD according to the first embodiment.
Figure 10B:
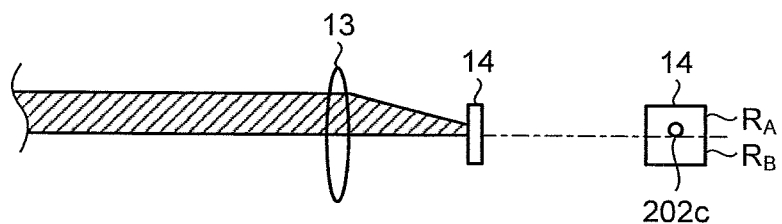
FIG. 10B is an explanatory view for the state of image formation on the two-segment PD according to the first embodiment.
Figure 10C:
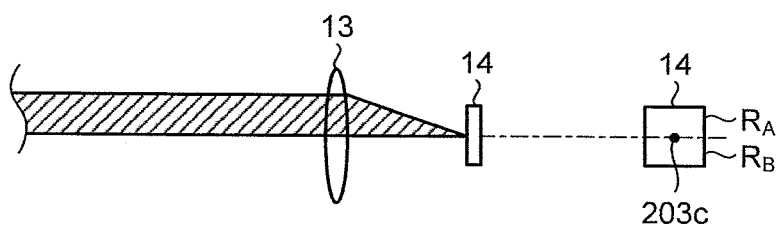
FIG. 10C is an explanatory view for the state of image formation on the two-segment PD according to the first embodiment.

FIGS. 8A to 8C, FIGS. 9A to 9C, and FIGS. 10A to 10C are explanatory diagrams for states of image forming on the two-segment PD 14: FIGS. 8A to 8C illustrate a case where the objective lens 3a of the middle NA is used; FIGS. 9A to 9C illustrate a case where the objective lens 3b of high NA is used; and FIGS. 10A to 10C illustrate a case where the objective lens 3c of low NA is used.

First, reference will be made to the case where the objective lens 3a of the middle NA is used and a bottom surface of the dish 28 is located lower than the in-focus position, namely, the case where the bottom surface of the dish 28 is located close to the objective lens 3a. In this case, the AF light is quickly reflected from the bottom surface of the dish 28. Therefore, as illustrated in FIG. 8B, a spot image 202a is focused onto the first segment $R_A$ of the two-segment PD 14. On the other hand, in the case where the bottom surface of the dish 28 is located higher than the in-focus position, namely, when the bottom surface of the dish 28 is located distant from the objective lens 3a, a spot image 201a is focused onto the second segment $R_B$ of the two-segment PD 14 as illustrated in FIG. 8A. In contrast, when the bottom surface of the dish 28 is accurately located at the in-focus position, a spot 203a is focused almost on a center of the optical axis in a range where the first segment $R_A$ and the second segment $R_B$ are equal as illustrated in FIG. 8C. In this case, since the bottom surface of the dish is at the in-focus position, the light intensity is highest.

When the objective lens 3b of high NA is used, as illustrated in FIGS. 9A and 9B, shapes of the spot images 201b and 202b located below and above the in-focus position, respectively, are larger than the spot images 201a and 202a when the objective lens of middle NA is used. When the objective lens 3c of low NA is used, as illustrated in FIGS. 10A and 10B, shapes of the spot images 201c and 202c located below and above the in-focus position, respectively, are smaller than the spot images 201a and 202a when the objective lens of middle NA is used. Furthermore, as illustrated in FIGS. 9C and 10C, when the bottom surface of the dish 28 is accurately located at the in-focus position, spot images 203b and 203c are focused almost on a center of the optical axis in the range where the first segment $R_A$ and the second segment $R_B$ are equal.

Thus, the spot focused onto the photodiode of the two-segment PD 14 varies depending on the objective lenses of middle NA, high NA, and low NA. As described above, the two-segment PD 14 divides the photodiode area into two segments (first segment $R_A$ and second segment $R_B$) by the optical axis of the reflection light, and functions as two sensors to detect the light intensity of the respective segments as the detection signals. The controller 24 calculates the EF value in the focus depth area at the Z position, and makes focus determination.

More specifically, the distance between the objective lens and the specimen SP is relatively changed, and AF operation is performed by moving the stage 1 such that the EF value becomes zero. More specifically, in the case where output from the first segment $R_A$ (detection signal $Q_A$) is high, the stage is driven downward, and in the case where output from the second segment $R_B$ (detection signal $Q_B$) is high, the stage 1 is moved upward. Consequently, accurate focus on the specimen SP can be achieved.

This moving amount is varied by characteristics of the objective lens and a used wavelength of the reference light source 4. Therefore, a movement value is stored in advance for each of the objective lenses 3a to 3c in the ROM or another recording medium such as an EEPROM that is a non-volatile memory, for example.

Figure 11:
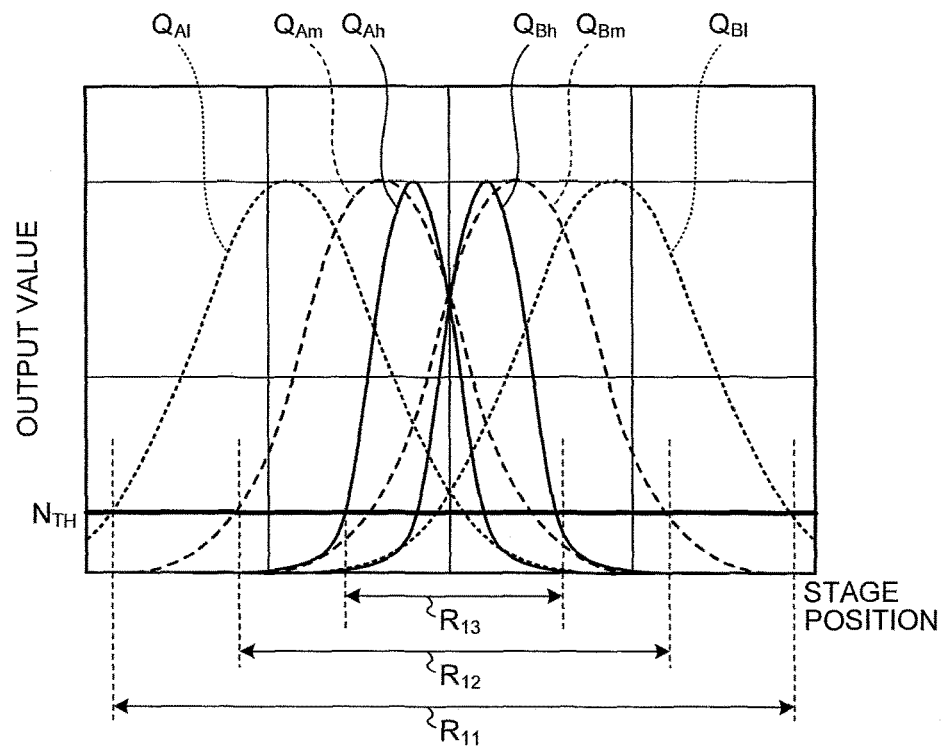
FIG. 11 is a graph illustrating intensity of a detection signal of the two-segment PD according to the first embodiment.
Figure 12:
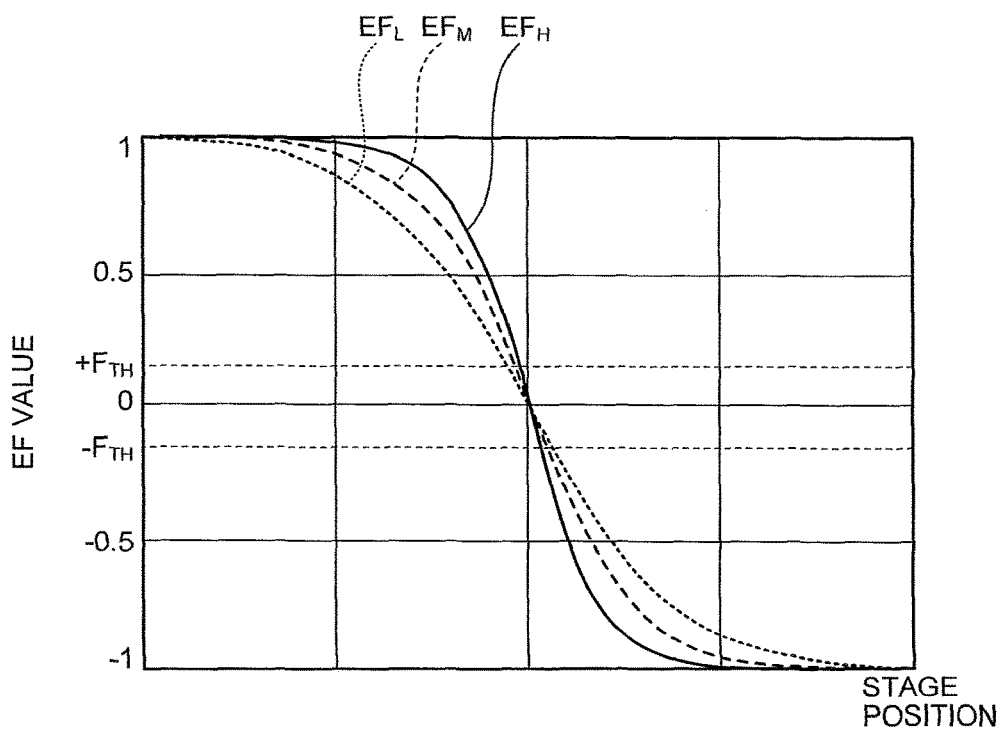
FIG. 12 is a graph illustrating an EF value calculated from the detection signal of the two-segment PD according to the first embodiment.

FIG. 11 is a graph illustrating intensity of the detection signals of the two-segment PD 14, in which $Q_{Am}$ represents a curve of an output value (signal intensity) of the detection signal $Q_A$ when the objective lens of middle NA is used, $Q_{Bm}$ represents a curve of an output value (signal intensity) of the detection signal $Q_B$ when the objective lens of middle NA is used, $Q_{Ah}$ represents a curve of an output value (signal intensity) of the detection signal $Q_A$ when the objective lens of high NA is used, $Q_{Bh}$ represents a curve of an output value (signal intensity) of the detection signal $Q_B$ when the objective lens of high NA is used, $Q_{Al}$ represents a curve of an output value (signal intensity) of the detection signal $Q_A$ when the objective lens of low NA is used, and $Q_{Bl}$ represents a curve of an output value (signal intensity) of the detection signal $Q_B$ when the objective lens of low NA is used. In the graph illustrated in FIG. 11, a vertical axis represents the output value, and a horizontal axis represents a position of the stage 1 (focusing portion.). FIG. 12 is a graph illustrating the EF value $((Q_A-Q_B)/(Q_A+Q_B))$ calculated from the detection signals $Q_A$ and $Q_B$ of the two-segment PD 14, in which $EF_M$ represents a curve of the EF value of the objective lens of middle NA, $EF_H$ represents a curve of the EF value of objective lens of high NA, and $EF_L$ represents a curve of the EF value of the objective lens of low NA.

The AF processing unit 243 determines the in-focus position by using the sum of the detection signals $Q_A$ and $Q_B(Q_A+Q_B)$ and the EF value $((Q_A-Q_B)/(Q_A+Q_B))$ as described below. First, a noise determination threshold $(N_{TH})$ set for each of the objective lenses 3a to 3c is read from a non-volatile memory (not illustrated) and compared with the value of $(Q_A+Q_B)$. As a result, when the value of $(Q_A-Q_B)$ is smaller than the predetermined noise determination threshold $N_{TH}$, namely, in the case of $(Q_A+Q_B)<N_{TH}$, the controller 24 determines that the bottom surface of the dish 28 is not captured, and the stage 1 is driven such that the value of $(Q_A+Q_B)$ becomes the noise determination threshold $N_{TH}$ or more, namely, such that $(Q_A+Q_B) \geq N_{TH}$ is satisfied.

As illustrated in FIG. 11, a range for capturing the bottom surface of the dish 28 is a range $R_{11}$ when the objective lens of low NA is used, a range $R_{12}$ when the objective lens of middle NA is used, and a range $R_{13}$ when the objective lens of high NA is used. That is, the range is narrowest when the objective lens of high NA is used, and the range becomes wider as magnification of of the objective lens becomes smaller.

Then, when $(Q_A+Q_B) \geq N_{TH}$ is satisfied, the controller 24 drives the stage 1 such that the EF value enters inside a predetermined in-focus range. More specifically, the controller 24 moves the stage 1 so as to satisfy a following formula (1), and stops movement of the stage 1 when the formula is satisfied.

$$-F_{TH}<(Q_A-Q_B)/(Q_A+Q_B)<+F_{TH} \quad (1)$$

Figure 13:
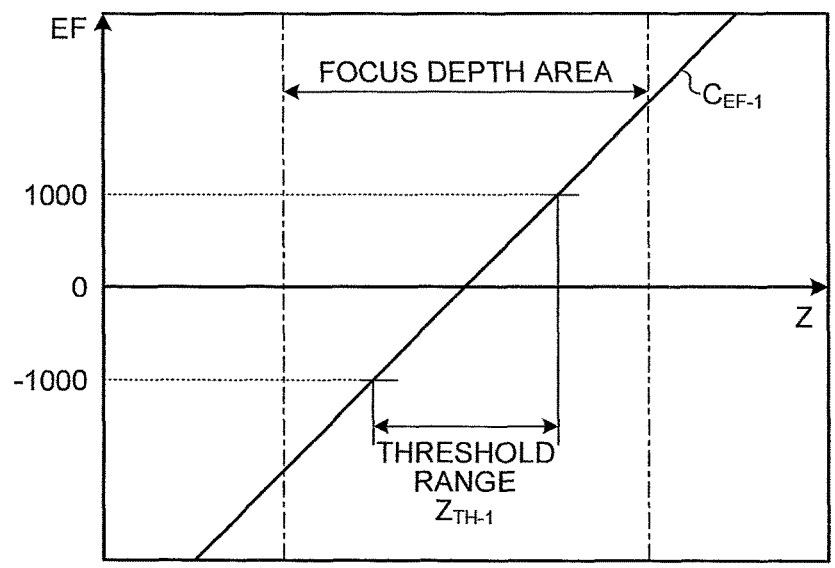
FIG. 13 is a diagram illustrating an exemplary Z-position dependence of the EF value in a focus depth area.
Figure 14:
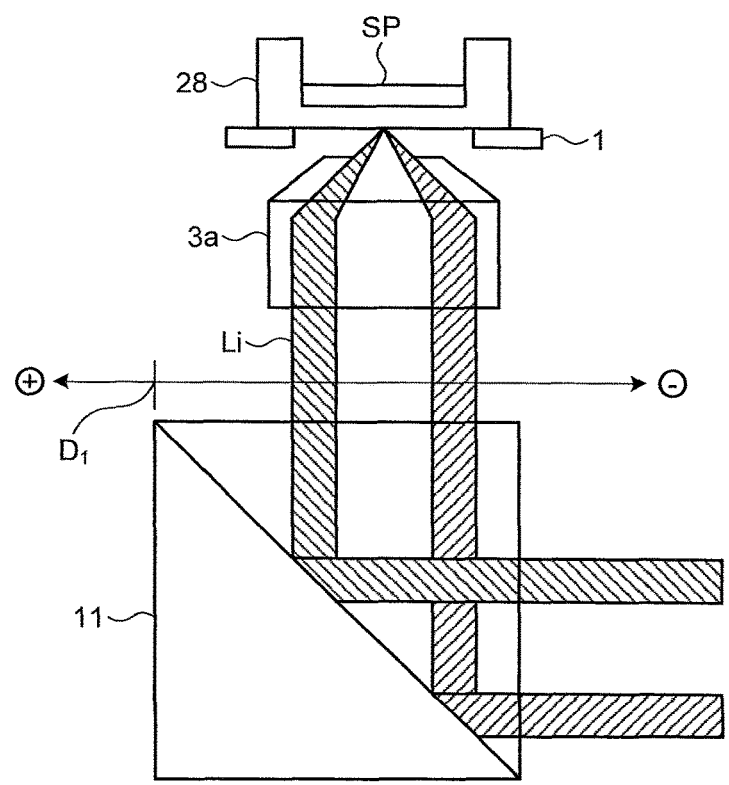
FIG. 14 is an explanatory view for a positional relation between the DM and the objective lens when the Z-position dependence of the EF value illustrated in FIG. 13 is obtained.
Figure 15:
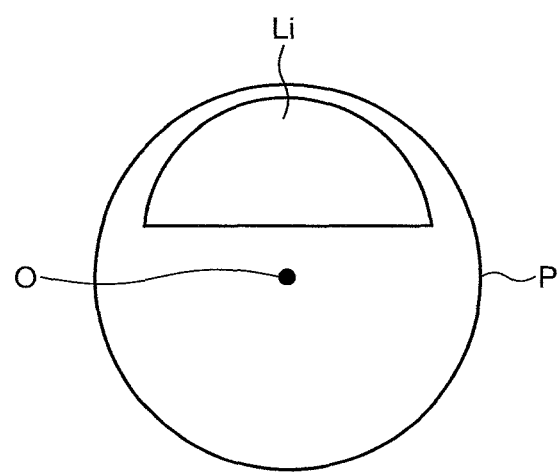
FIG. 15 is an explanatory diagram for entrance of a laser luminous flux that enters the objective lens from the DM located at the position illustrated in FIG. 14.
Figure 16:
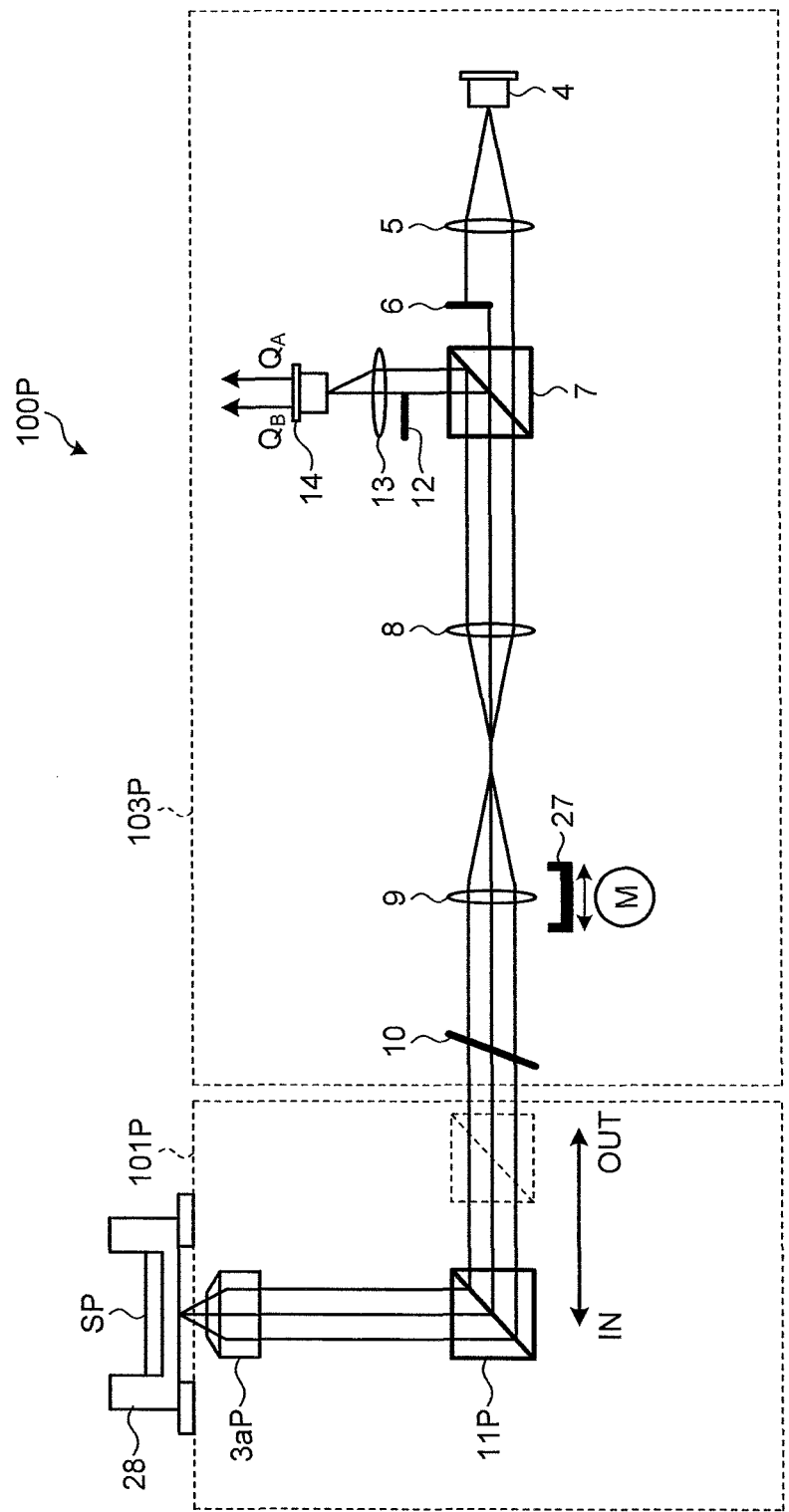
FIG. 16 is a schematic diagram illustrating a configuration of a main portion of a conventional microscope system.
Figure 17:
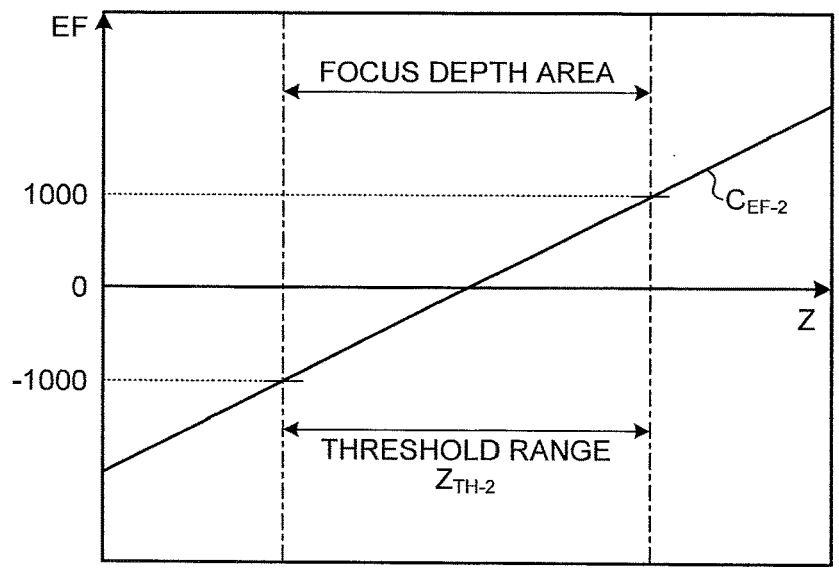
FIG. 17 is a diagram illustrating an exemplary Z-position dependence of the EF value in the focus depth area.
Figure 18:
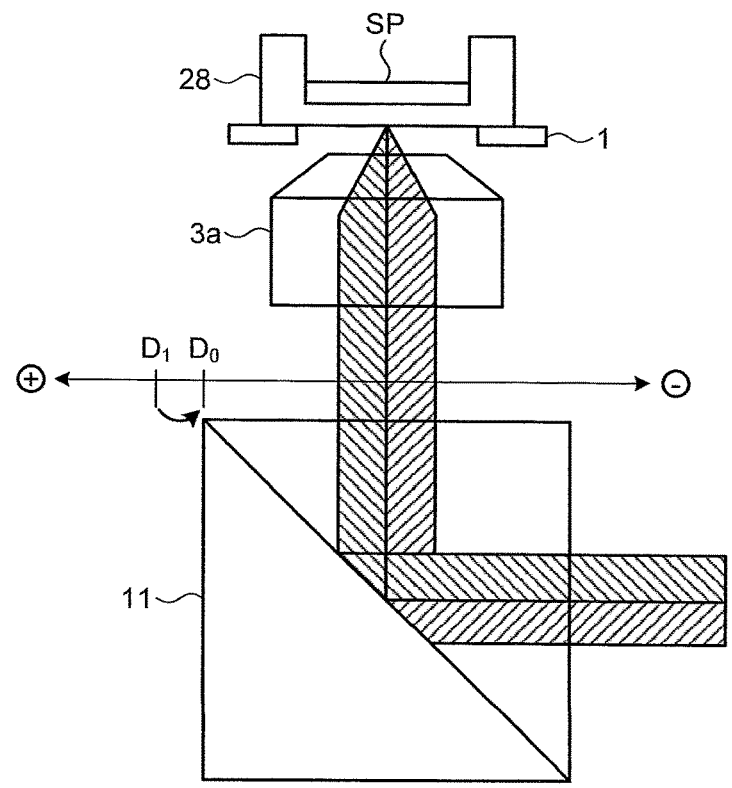
FIG. 18 is an explanatory view for a positional relation between the DM and the objective lens in the case where the Z-position dependence of the EF value illustrated in FIG. 17 is obtained.
Figure 19:
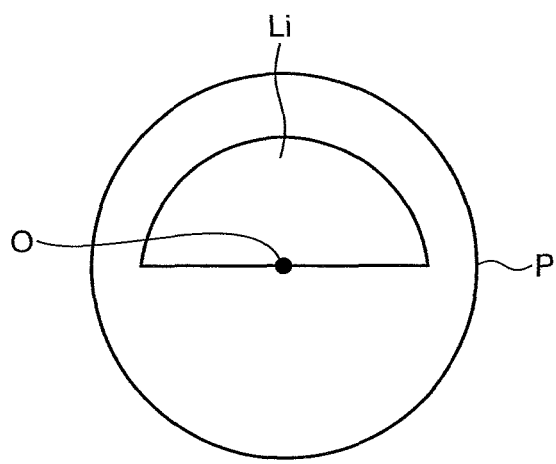
FIG. 19 is an explanatory diagram for entrance of a laser luminous flux that enters the objective lens from the DM position illustrated in FIG. 18.

Here, $F_{TH}$ represents a focus determination threshold, and is determined such that the position of the stage 1 is surely moved inside the focus depth area of each of the objective lenses, and also is a value set for each of the objective lenses. FIG. 13 and FIG. 17 are diagrams illustrating examples in which an area $A_1$ in FIG. 7 is enlarged, and also illustrating the exemplary Z-position dependence of the EF value in the focus depth area. The area $A_1$ is the range including the focus depth area and also is the area where lines $C_{EF-1}$ and $C_{EF-2}$ representing the Z-position dependence properties of the EF value can be deemed as substantially straight lines. FIG. 14 is an explanatory view for a positional relation between the DM 11 and the objective lens 3a in the case of obtaining the line $C_{EF-1}$ illustrated in FIG. 13 as the Z-position dependence of the EF value. FIG. 15 is an explanatory diagram for entrance of a laser luminous flux that enters the objective lens 3a from the DM 11 located at a position illustrated in FIG. 14. FIG. 16 is a schematic diagram illustrating a configuration of a main portion of a conventional microscope system. FIG. 18 is an explanatory view for a positional relation between the DM 11 and the objective lens 3a in the case where the line $C_{EF-2}$ illustrated in FIG. 17 is obtained as the Z-position dependence of the EF value. FIG. 19 is an explanatory diagram for entrance of the laser luminous flux that enters the objective lens 3a from the DM 11 located at a position illustrated in FIG. 18. In the examples of FIGS. 13 and 17, the focus determination threshold $F_{TH}$ is set at 1000.

In the example illustrated in FIG. 13, the controller 24 determines that focusing is achieved when the stage 1 enters a threshold range $Z_{TH-1}$ in which the EF value in the focus depth area is the value of ±1000. Furthermore, in the example illustrated in FIG. 17, the controller 24 determines that focusing is achieved when the stage 1 enters a threshold range $Z_{TH-2}$. Here, a slope of the line $C_{EF-3}$ illustrated in FIG. 13 is steeper, compared to the line $C_{EF-2}$ illustrated in FIG. 17. Consequently, the threshold range $Z_{TH-1}$ becomes narrower than the threshold range $Z_{TE-2}$ illustrated in FIG. 17. The reason is that, as illustrated in FIG. 14, the DM 11 inserted on the observation light path at the time of AF processing deviates to a position $D_1$ on the positive side in the inserting direction, and therefore, a laser luminous flux Li entering from the DM 11 also deviates to an end portion side from a center O of a pupil P of the objective lens as illustrated in FIG. 15. In this case, the controller 24 needs to adjust the position of the stage 1 to the inside of the very narrow threshold range $Z_{TH-1}$, and when influence is received from noise or vibration, focus determination is hardly converged. Furthermore, in the case where the slope of the line $C_{EF}$ is small (not illustrated), focus determination may be made outside the focus depth area.

In a conventional microscope system 100P illustrated in FIG. 16, a DM 11P is provided at a given position inside a microscope main body 101P in a movable manner. In this structure, when a light path of AF light of an AF unit 103P deviates from an optical axis of the microscope main body 101P due to, for example, production variations of the AF unit 103P, the AF light reflected from the DM 11P enters deviating from a pupil center of an objective lens 3aP at the time of AF processing. Therefore, in the case where the light path of the AF unit deviates from the optical axis of the microscope main body in the structure of the related art, the stage 1 is focused inside the narrow threshold range $Z_{TH-1}$ illustrated in FIG. 13, and focus determination may be hardly made without delay.

In the first embodiment, the movable DM 11 is provided in the AF unit 103, and the processing to cause the DM drive control unit 250 to move the DM 11 to the arrangement position on the observation light path that is preliminarily correlated to the objective lens is performed under control of the DM drive control unit 250 before performing actual AF processing on the specimen SP (refer to FIG. 6). Even, in the case where the DM 11 deviates to the positive side in the inserting direction as illustrated in FIG. 14, the DM 11 is moved to an arrangement position $D_0$ correlated to the objective lens 3a as indicated by an arrow (refer to FIG. 18). Therefore, as illustrated in FIG. 19, the laser luminous flux Li from the DM 11 enters the pupil P of the objective lens 3a without deviating from the center O of the pupil P. As a result, for example, the slope of the line $C_{EF-2}$ is more gradual than the slope of the line $C_{EF-1}$ in FIG. 13, and the threshold range $Z_{TH-2}$ expands to a range substantially equal to the focus depth area as illustrated in FIG. 17. Therefore, the controller 24 can determine that focusing is achieved when the stage 1 enters the threshold range $Z_{TH-2}$, and focus determination can be easily converged compared to the example in FIG. 13.

Thus, in the first embodiment, the arrangement position of the DM 11 on the observation light path at the time of AF processing is moved, to the arrangement position in accordance with the objective lens arranged in such a manner that the optical axis is aligned with the light path, thereby aligning the light path of the infrared light for AF processing with the optical axis of the microscope main body 101. As a result, variations of characteristics of the AF signal at the time of AF processing can be reduced, and sufficient AF performance can be secured. Therefore, according to the first embodiment, deviation between the light path of the infrared light for the AF processing in the AF unit 103 and the optical axis of the microscope main body 101 is prevented, and AF performance can be optimized in accordance with the objective lens.

In the first embodiment, the arrangement position of the DM 11 on the observation light path at the time of AF processing, namely, the reference position and the correction value of the DM 11 are preliminarily obtained per objective lens. Accordingly, a description will be provided for processing performed by the controller 24 in order to obtain the arrangement position of DM 11 on the observation light path at the time of AF processing in accordance with the objective lens.

Figure 20:
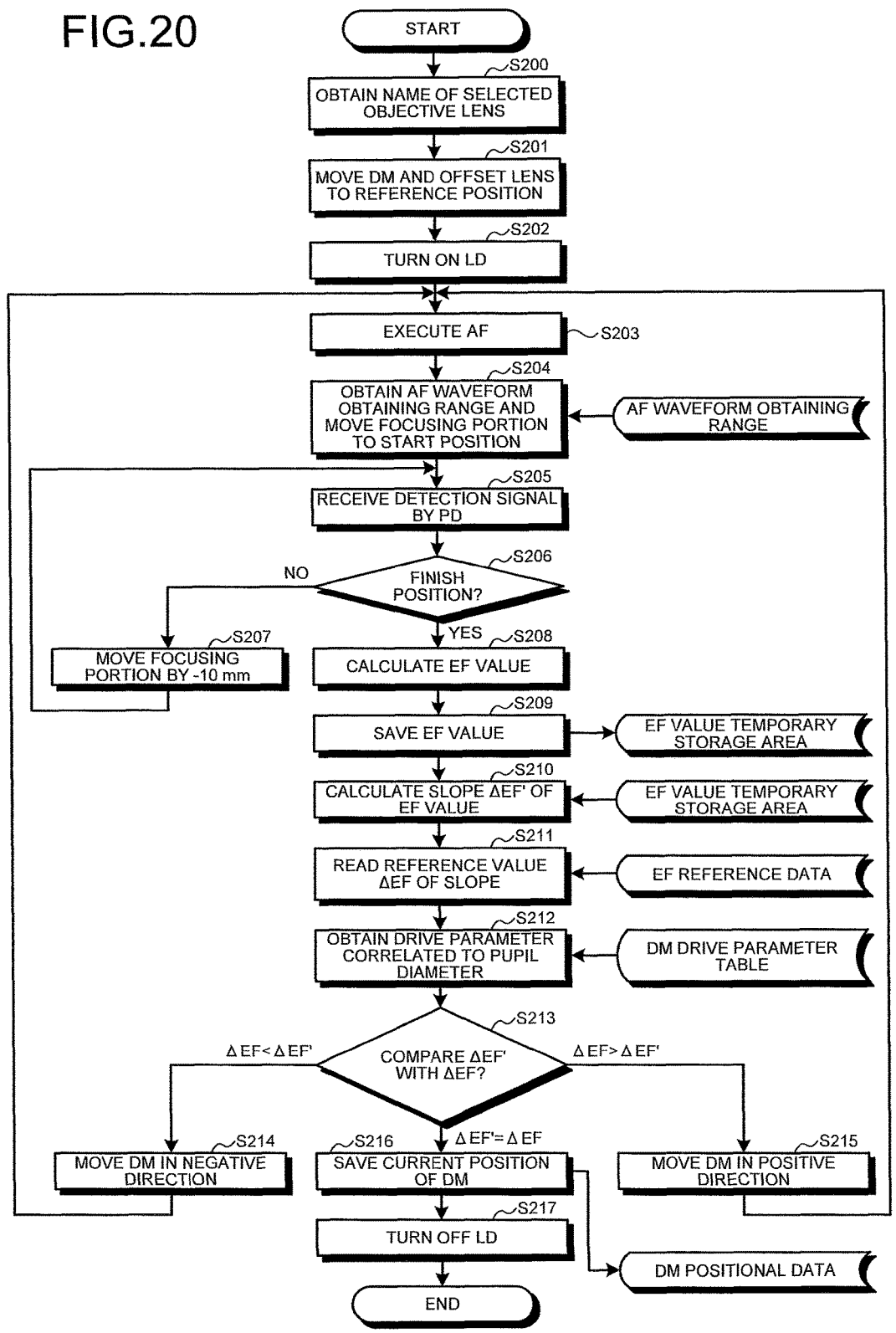
FIG. 20 is a flowchart illustrating a processing procedure performed by the control unit illustrated in FIG. 3 in order to obtain an arrangement position of the DM on the observation light path according to each objective lens.
Figure 21:
FIG. 21 is a diagram illustrating exemplary data stored by a DM drive parameter storage unit illustrated in FIG. 3.
Figure 22:
FIG. 22 is a diagram illustrating exemplary data stored by the DM drive parameter storage unit illustrated in FIG. 3.
Figure 23:
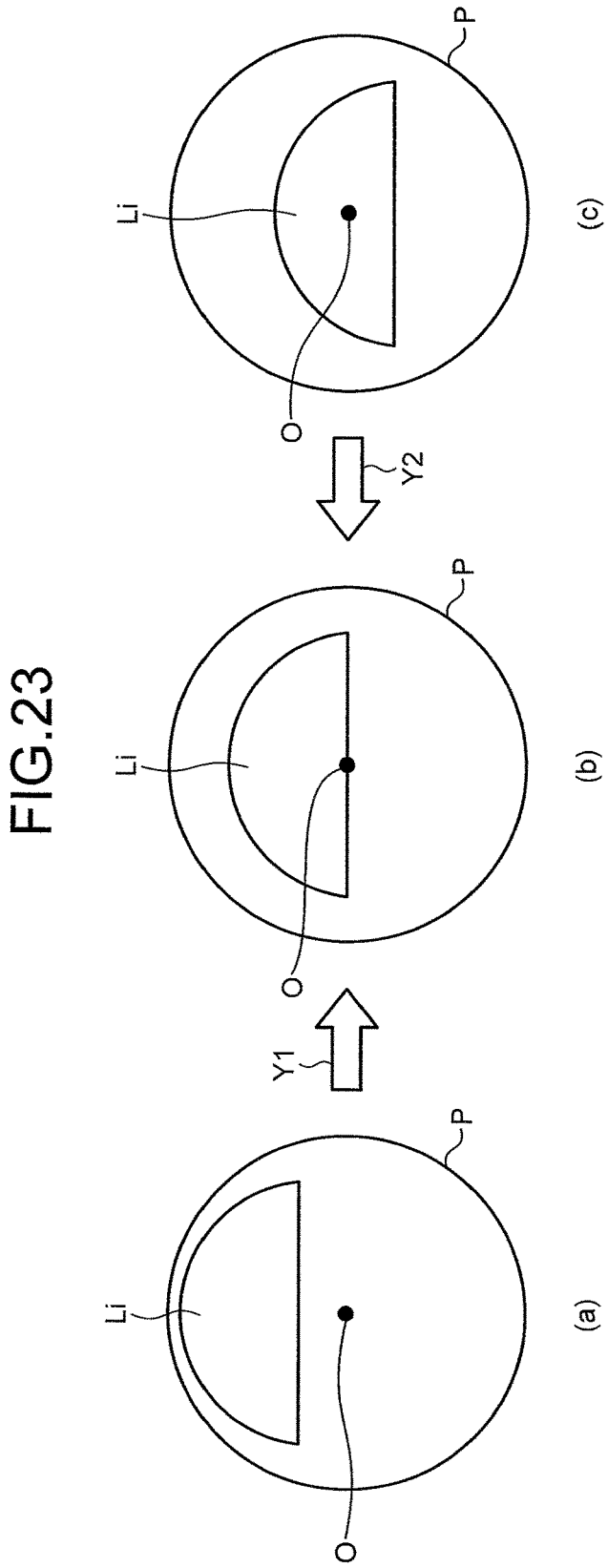
FIG. 23 is a diagram illustrating exemplary entrance of the laser luminous flux that enters the objective lens from the DM illustrated in FIG. 2.
Figure 24:
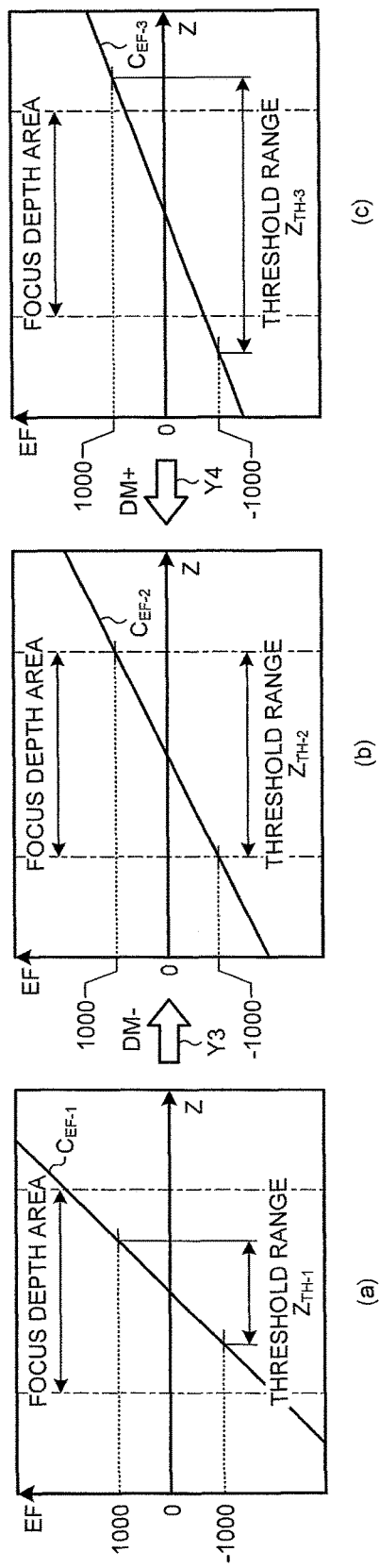
FIG. 24 is a diagram illustrating an exemplary Z-position dependence of the EF value in the focus depth area.

FIG. 20 is a flowchart illustrating a processing procedure performed by the controller 24 in order to obtain the arrangement position of the DM 11 on the observation light path in accordance with each objective lens. FIGS. 21 and 22 are diagrams illustrating exemplary data stored by the DM drive parameter storage unit 252. FIG. 23 is a diagram illustrating exemplary entrance of the laser luminous flux that enters the objective lens from the DM 11, FIG. 24 is a diagram illustrating an exemplary Z-position dependence of the EF value in the focus depth area.

When an automatic correction start button for the DM 11 (not illustrated) is pushed, the processing to obtain the arrangement position of the DM 11 on the observation light path is started. As illustrated in FIG. 20, the controller 24 obtains a name of the objective lens selected to be located on the light path based on a detection result of the revolver hole position detection unit 21 (Step S200), and the pupil diameter of the selected objective lens is obtained from the objective lens pupil diameter holding unit 253. The controller 24 performs the following processing in order to obtain the arrangement position of the DM 11 on the observation light path in accordance with this objective lens. First, the controller 24 refers to the DM reference position storage unit 251 and obtains the reference position of the DM 11 correlated to the selected objective lens, and then causes the DM drive control unit 250 to move the DM 11 to the reference position. Furthermore, the controller 24 obtains the reference position of the offset lens group 9 correlated to the selected objective lens and moves the offset lens group to the reference position (Step S201). The controller 24 causes the laser drive control unit 248 to turn on an LD that is the reference light source 4 (Step S202).

The controller 24 executes the AF processing by controlling the respective units (Step S203). The controller 24 reads an AF waveform obtaining range (a minimum value and a maximum value of the Z position) in accordance with the selected objective lens from a storage unit (not illustrated) inside the controller 24, and causes the focusing portion drive control unit 246 to move the Z position of the focusing portion (stage 1) to a start position (Step S204). The start position is the Z position obtained by adding the maximum value to a current position. Furthermore, a finish position is the Z position obtained by adding the minimum value to the current position.

The controller 24 receives the detection signals $Q_A$ and $Q_B$ detected by the two-segment PD 14 at the start position (Step S205). The controller 24 determines whether the Z position of the focusing portion (stage 1) is the finish position (Step S206). If the Z position of the focusing portion (stage 1) is not the finish position (Step S206: No), the controller 24 causes the focusing portion drive control unit 246 to move the Z position of the focusing portion (stage 1) by, for example, −10 mm (Step S207) and receives the detection signals $Q_A$ and $Q_B$ detected by the two-segment PD 14 at this position (Step S205). The controller 24 repeats the processing from Step S205 to Step S207 until the Z position of the focusing portion (stage 1) reaches the finish position.

If the controller 24 determines that the Z position of the focusing portion (stage 1) is the finish position (Step S206: Yes), the EF value calculation unit 242 calculates the EF value in the focus depth area from the detection signals $Q_A$ and $Q_B$ for each of the obtained Z positions (Step S208), and saves the calculated EF value in an EF value temporary storage area (not illustrated) inside the controller 24 (Step S209). The ΔEF calculation unit 244 obtains the EF value for each of the Z positions stored in the EF value temporary storage area, calculates an approximate line from the obtained EF value by using a least squares method, and calculates the slope ΔEF' of the EF value relative to the Z-axis in the focus depth area. (Step S210), and then outputs the same to the determination unit 254. The determination unit 254 reads a slope reference value ΔEF from the EF reference data storage unit 245 in accordance with the selected objective lens (Step S211). The reference value ΔEF is, for example, the slope of the line $C_{EF}$ in the case where the threshold range $Z_{TH}$ of the focusing portion (stage 1) that can be determined as focused is the same range as the focus depth.

The determination unit 254 and the setting unit 255 obtain, from the DM drive parameter storage unit 252, various kinds of drive parameters correlated to the pupil diameters of the selected objective lens (Step S212). As illustrated in FIG. 21, the DM drive parameter storage unit 252 stores a table T2 in which a determination result in the determination unit 254 is correlated to a moving direction of the DM 11 set by the setting unit 255. As illustrated in FIG. 22, the DM drive parameter storage unit 252 stores a table T3 in which a moving step (moving width) and a moving speed of the DM 11 are correlated to each pupil diameter of the objective lens. The determination unit 254 and the setting unit 255 read, from data of the tables T2 and T3, various kinds of drive parameters and perform the following processing.

The determination unit 254 compares the magnitude of the slope ΔEF' value calculated by the ΔEF calculation unit 244 in Step S210 with the magnitude of the reference value ΔEF read from the EF reference data storage unit 245 in Step S211 (Step S213).

In the case where the determination unit 254 determines that the slope ΔEF' is larger than the reference value ΔEF (Step S213: ΔEF<ΔEF'), the laser luminous flux Li entering from the DM 11 deviates from the center O of the pupil P of the objective lens as illustrated in (a) of FIG. 23, and the threshold range $Z_{TH\text{-}1}$ of the focusing portion (stage 1) that can be determined as focused is narrower than the focus depth area like the line $C_{EF\text{-}1}$ in (a) of FIG. 24. Therefore, in this case, the setting unit 255 sets the moving direction of the DM 11 to the negative direction opposing to the inserting direction in accordance with the parameter provided in the table T2 in order to make the slope EF value relative to the Z-axis smaller. Consequently, the DM drive control unit 250 drives the DM motor drive unit 29 and the DM motor 30 to move the DM 11 in the negative direction (Step S214). More specifically, as illustrated in (a) of FIG. 23, the DM drive control unit 250 approximates, to the center O of the pupil P of the objective lens, the laser luminous flux Li deviating to the end portion side of the pupil P of the objective lens (refer to (b) of FIG. 23), and moves the DM 11 in the negative direction (refer to arrows Y1, Y3 in FIGS. 23 and 24) in order to widen the threshold range $Z_{TH\text{-}1}$ of the focusing portion (stage 1) that can be determined as focused up to the threshold range $Z_{TH\text{-}2}$ equivalent to the focus depth (refer to (b) of FIG. 23). In this case, the setting unit 255 moves the DM 11 by the moving step (moving width) at the moving speed correlated to the pupil diameter of the selected objective lens in accordance with the parameters provided in the table T3. In the case where the pupil diameter of the selected objective lens is φ5 mm, the setting unit 255 performs setting so as to move the DM 11 in the negative direction by the moving step 0.05 mm at the moving speed of 4800 pps. After the processing in Step S214, the controller 24 returns to Step S203 and executes the processing from Step S203 in order to examine whether the position of the newly moved DM 11 is in the arrangement of the DM 11 on the observation light path.

In the case where the determination, unit 254 determines that the slope ΔEF is larger than the reference value ΔEF" (Step S213: ΔEF>ΔEF'), the laser luminous flux Li entering from the DM 11 deviates to the center O side of the pupil P of the objective lens as illustrated in (c) of FIG. 23, and the threshold range $Z_{TH\text{-}3}$ of the focusing portion (stage 1) that can be determined as focused is wider than the focus depth area like the line $C_{EF\text{-}3}$ in (c) of FIG. 24. In this case, the setting unit 255 sets the moving direction of the DM 11 to the positive direction same as the inserting direction in accordance with the parameter provided in the table T2 in order to make the slope of the EF value relative to the Z-axis steeper Consequently, the DM drive control unit 250 drives the DM motor drive unit 29 and the DM motor 30 to move the DM 11 in the positive direction (Step S215). More specifically, as illustrated in (c) of FIG. 23, the DM drive control unit 250 approximates the laser luminous flux Li deviating to the center of the pupil P of the objective lens so as to conform to the center O of the pupil P of the objective lens (refer to (b) of FIG. 23), and moves the DM 11 in the positive direction (refer to arrows Y2, Y4 in FIGS. 23 and 24) in order to narrow the threshold range $Z_{TH\text{-}3}$ of the focusing portion (stage 1) that can be determined as focused to the threshold range $Z_{TH\text{-}2}$ equivalent to the focus depth area (refer to (b) of FIG. 23). In this case also, same as Step S214, the setting unit 255 moves the DM 11 by the moving step at the moving speed correlated to the pupil diameter of the selected objective lens in accordance with the parameters provided in the table T3. After the processing in Step S215, the controller 24 returns to Step S203 and executes the processing from Step S203 in order to examine whether the position of the newly moved DM 11 is in the arrangement position of the DM 11 on the observation light path.

In the case where the determination unit 254 determines that the slope ΔEF' and the reference value ΔEF are equal (Step S213: ΔEF'=ΔEF), the controller 24 obtains the current position of the DM 11 as arrangement position of the DM 11 on the observation light path in accordance with the selected objective lens. The controller 24 stores, in the DM position storage unit 249, the obtained arrangement position of the DM 11 on the observation light path correlated to the selected objective lens (Step S216). The controller 24 causes the laser drive control unit 248 to turn off the LD that is the reference light source 4 (Step S217), and finishes the process to obtain the arrangement position of the DM 11 on the observation light path in accordance with the selected objective lens. The controller 24 obtains a corrected position of the arrangement position of the DM 11 on the observation light path in accordance with each objective lens by performing, per objective lens, the respective processing procedures illustrated in FIG. 20.

Thus, in the controller 24, the DM drive control unit 250 causes the DM motor drive unit 29 and the DM motor 30 to sequentially move the DM 11 from the predetermined reference position by the moving step determined per objective lens, and the AF processing unit 243 controls the microscope main body 101 and the AF unit 103 so as to respectively perform the AF processing in each position of the DM 11. Additionally, the controller 24 automatically obtains, as the arrangement position of the DM 11 on the observation light path in accordance with the selected objective lens, the position of the DM 11 in the case where the determination unit 254 determines that the slope ΔEF' calculated by the ΔEF calculation unit 244 is equal to the reference value ΔEF.

In the case where the determination unit 254 determines that the slope ΔEF' differs from the reference value ΔEF, the setting unit 255 sets the moving direction of the DM 11 based on the comparison between the slope ΔEF' and the reference value ΔEF, thereby approximating the position of the DM 11 to correct arrangement.

Furthermore, the moving steps of the DM 11 in Steps S214 and S215 of FIG. 20 are set correlated to the pupil diameter of the objective lens per objective lens. Since the controller 24 determines arrangement of the DM 11 on the observation light path while moving the DM 11 by the moving step correlated to the pupil diameter of the objective lens, position adjustment of the DM 11 can be correctly performed in accordance with the objective lens.

In the related art, adjustment of an optical axis is needed to be manually performed such that an optical axis of an observation optical system is aligned with a light path of the AF light source. However, since such adjustment requires highly-skilled technique, adjustment is needed to be performed by a technical specialist before shipment, and the microscope main body 101P and the AF unit 103P are needed to be shipped out as one set. More specifically, the AF unit 103P cannot be shipped out independently, and in the case where a user introduces the AF unit 103P later, following procedures are to be taken: the user sends the microscope main body 101P to a prescribed factory or a service center; optical adjustment between the microscope main body 101P and the AF unit 103P is performed by a technical specialist; and then the microscope main body 101P and the AF unit 103P are delivered to the user. Therefore, there is downtime for the user.

In contrast, in the first embodiment, just by pushing the automatic correction start button for the DM 11, the processing illustrated in FIG. 20 can be performed to obtain the arrangement position of the DM 11 on the observation light path, and in this arrangement position, the optical axis of the observation optical system can be aligned with the light path of the AF light source. Therefore, according to the present embodiment, there is no need to send the microscope main body 101 to a factory or the like to perform optical axis adjustment between the microscope main body 101 and the AF unit 103, and the user's down time can be minimized.

In the first embodiment, the controller 24 adjusts the arrangement position of the DM 11 on the observation light path relative to the inserting direction of the DM 11, However, the controller 24 may also have a function to obtain the arrangement position of the DM 11 on the observation light path relative to a direction vertical to the inserting direction of the DM 11.

Modified Example of First Embodiment

Figure 25:
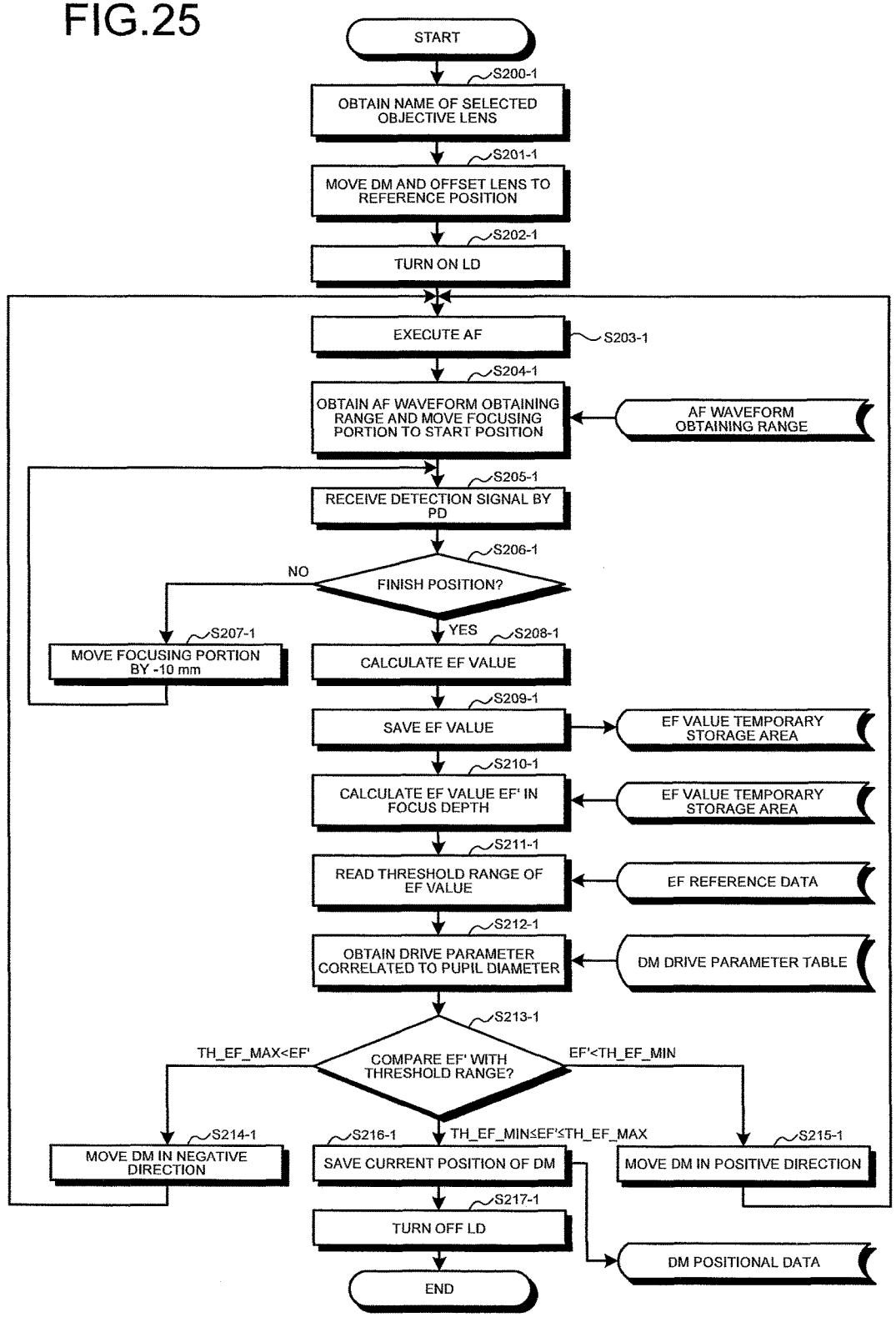
FIG. 25 is a flowchart illustrating another processing procedure performed by the control unit illustrated in FIG. 3 in order to obtain an arrangement position of the DM on the observation light path according to each objective lens.
Figure 26:
FIG. 26 is a diagram illustrating exemplary data stored by the DM drive parameter storage unit.

As a modified example of the first embodiment, provided is another exemplary processing procedure performed by the controller 24 in order to obtain an arrangement position of the DM 11 on the observation light path in accordance with each objective lens. FIG. 25 is a flowchart illustrating another processing procedure performed by the controller 24 in order to obtain the arrangement position of the DM 11 on the observation light path in accordance with each objective lens. FIG. 26 is a diagram illustrating exemplary data stored by the DM drive parameter storage unit 252.

Step S200-1 to Step S209-1 in FIG. 25 correspond to Step S200 to Step S209 illustrated in FIG. 20, respectively. The EF value calculation unit 242 obtains an EF value for each Z position stored in the EF value temporary storage area, calculates an approximate line from the obtained EF value by using the least squares method, and calculates the EF value (EF') in the focus depth area (Step S210-1), and then outputs the same to the determination unit 254. The determination unit 254 reads a threshold range in accordance with a selected objective lens (Step S211-1). The threshold range is stored per objective lens in the EF reference data storage unit 245. The EF reference data storage unit 245 stores, as the threshold range of the EF value, a minimum value of a threshold of the EF value (TH_EF_MIN) and a maximum value of the threshold of the EF value (TN_EF_MAX).

The determination unit 254 and the setting unit 255 obtain, from the DM drive parameter storage unit 252, various kinds of drive parameters correlated to the pupil diameters of the selected objective lens (Step S212-1). As illustrated in FIG. 26, the DM drive parameter storage unit 252 stores a table T4 in which determination results in the determination unit 254 is correlated to following moving directions of the DM 11 to be set by the setting unit 255. The determination unit 254 and the setting unit 255 read data of the table T4 and the above-described table T3, and perform subsequent processing.

The determination unit 254 compares the magnitude of the EF' calculated by the EF value calculation unit 242 in Step S210-1 with the magnitude of the threshold range read from the EF reference data storage unit 245 in Step S211-1 (Step S213-1). The determination unit 254 compares the EF' with TH_EF_MIN and TH_EF_MAX.

In the case where the determination unit 254 determines that the EF' is larger than TH_EF_MAX (Step S213-1: TH_EF_MAX<EF'), the slope of the EF value relative to the Z-axis is needed to be made more gradual. Therefore, the setting unit 255 sets the moving direction of the DM 11 to the negative direction in accordance with the parameters provided in the table T4. Consequently, the CM drive control unit 250 drives the DM motor drive unit 29 and the DM motor 30 to move the DM 11 in the negative direction (Step S214-1). In this case, same as Step S214, the setting unit 255 moves the DM 11 by the moving step at the moving speed correlated to the pupil diameter of the selected objective lens in accordance with the parameters provided in the table T3. After the processing in Step S214-1, the controller 24 returns to Step S203-1 and executes the processing from Step S203-1 in order to examine whether the position of the newly moved DM 11 is in the arrangement position of the DM 11 on the observation light path.

In the case where the determination unit 254 determines that the EF' is smaller than TH_EF_MIN (Step S213-1: EF'<TH_EF_MIN), the slope of the EF value relative to the Z-axis is needed to be made steeper. Therefore, the setting unit 255 sets the moving direction of the DM 11 to the positive direction in accordance with the parameters provided in the table T4. Consequently, the DM drive control unit 250 drives the DM motor drive unit 29 and the DM motor 30 and moves the DM 11 in the positive direction (Step S215-1). In this case also, same as Step S214-1, the setting unit 255 moves the DM 11 by the moving step at the moving speed correlated to the pupil diameter of the selected objective lens in accordance with the parameters provided in the table T3. After the processing in Step S215-1, the controller 24 returns to Step S203-1 and executes the processing from Step S203-1 in order to examine whether the position of the newly moved DM 11 is in the arrangement position of the DM 11 on the observation light path. Thus, in the case where the determination unit 254 determines the EF value (EF') is out of the threshold range, the setting unit 255 sets the moving direction of the DM 11 based on the comparison between the EF' and the threshold range in accordance with the table T4.

If the determination unit 254 determines that the EF' is within the threshold range of the EF value, namely, TH_EF_MIN≤EF'≤TH_EF_MAX (Step S213-1: TH_EF_MIN≤EF'≤TH_EF_MAX), the controller 24 obtains a current position of the DM 11 in this case as the arrangement position of the DM 11 on the observation light path in accordance with the selected objective lens. The controller 24 stores, in the DM position storage unit 249, the obtained arrangement position of the DM 11 on the observation light path correlated to the selected objective lens (Step S216-1). Step S217-1 corresponds to Step S217 in FIG. 20. The controller 24 obtains the arrangement position of the DM 11 on the observation light path in accordance with each objective lens by performing, per objective lens, the respective processing procedures illustrated in FIG. 25.

Like the modified example of the first embodiment, the position of the DM 11 in which the EF value in the focus depth area is within a predetermined threshold range may be obtained, per the objective lens, as the arrangement position of the DM 11 on the observation light path. The EF value is calculated by the EF value calculation unit 242 based on a result of light reception of the two-segment PD 14 in the automatic focus processing performed for obtaining the DM position.

Second Embodiment

Next, a second embodiment will be described. In the second embodiment, additionally, variations caused by a position of an offset lens group are also cancelled.

Figure 27:
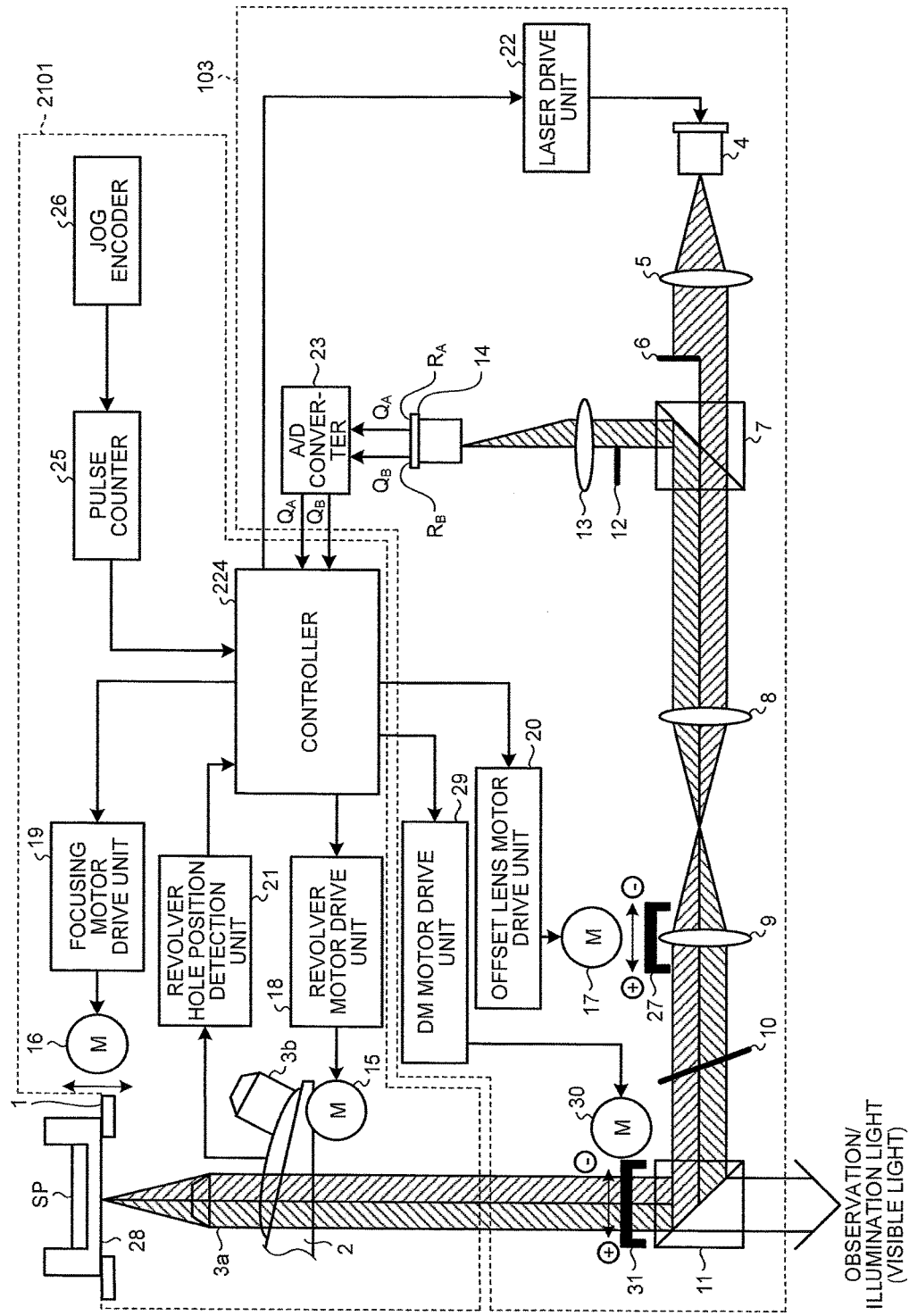
FIG. 27 is a schematic diagram illustrating a main configuration of the microscope system according to a second embodiment.

FIG. 27 is a schematic diagram illustrating a main configuration of a microscope system according to the second embodiment. As illustrated in FIG. 27, the microscope system according to the second embodiment includes a microscope main body 2101 including a controller 224 instead of the controller 24 illustrated in FIG. 2.

Figure 28:
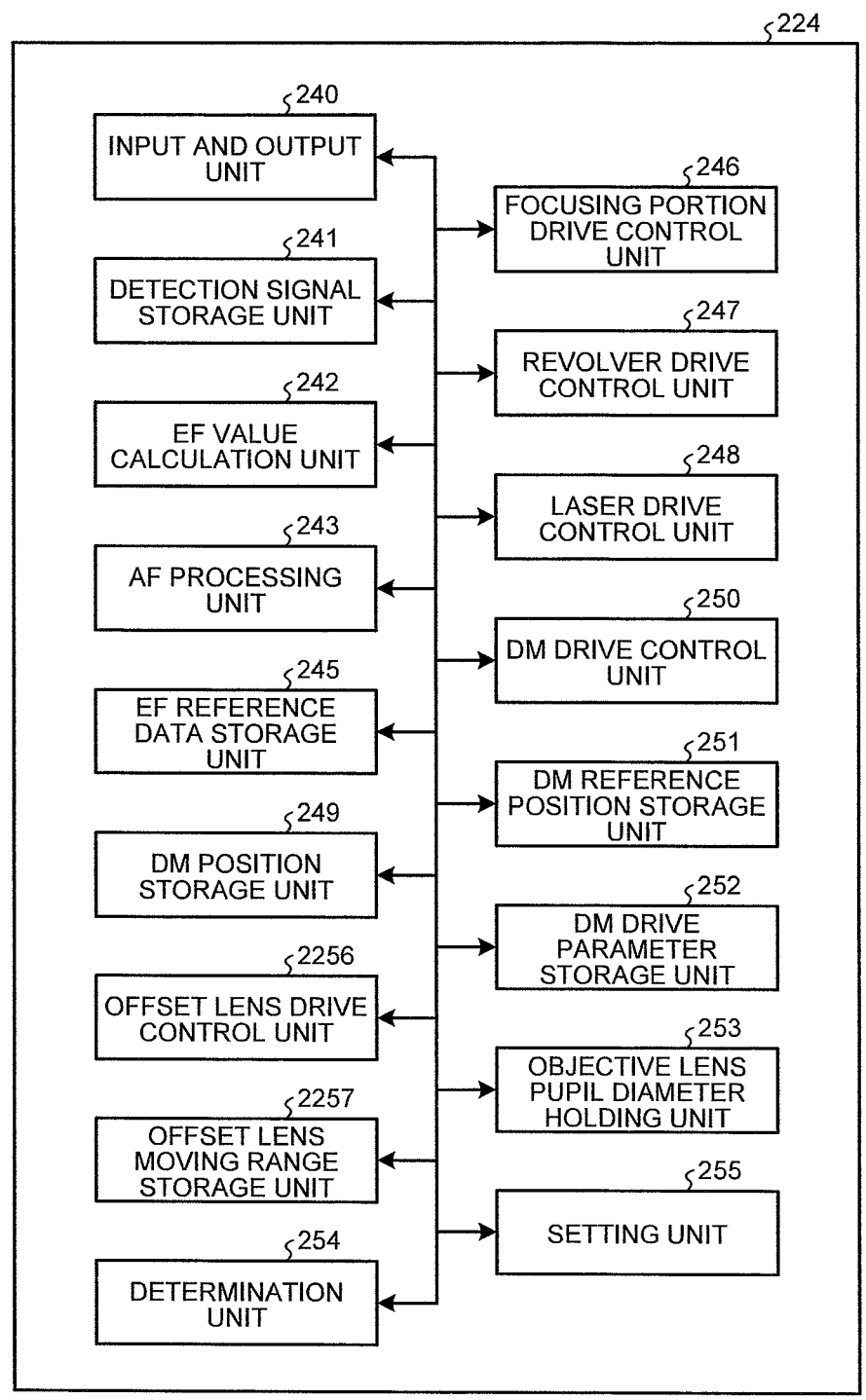
FIG. 28 is a block diagram illustrating an internal configuration of a control unit illustrated in FIG. 27.

FIG. 28 is a block diagram illustrating an internal configuration of the controller 224 illustrated in FIG. 27. The controller 224 controls respective units, thereby obtaining, per objective lens, a position of a DM 11 in the case where the offset lens group 9 is located in a minimum position of a predetermined moving range as an arrangement position of the DM 11 on an observation light path from among positions of the DM 11 in which an EF value in a focus depth area is within a predetermined threshold range. The EF value is calculated based on a light receiving result of a two-segment PD 14 in AF processing executed to obtain a DM position. The controller 224 causes a DM position storage unit 249 to store the obtained arrangement position of the DM 11 on the observation light path correlated to the objective lens. Compared to the controller 24 illustrated in FIG. 3, the controller 224 has a structure omitting an ΔEF calculation unit 244, and has a structure further including an offset lens drive control unit 2256 and an offset lens moving range storage unit 2257.

The offset lens drive control unit 2256 commands an offset lens motor drive unit 20 to drive an offset lens motor 17 in order to move the offset lens group 9.

FIG. 29 is a diagram illustrating exemplary data stored by the offset lens moving range storage unit 2257. As illustrated in FIG. 29, the offset lens moving range storage unit 2257 stores a table T5 in which a moving range and a moving step (moving width) of the offset lens group 9 are correlated to each objective lens.

Figure 30:
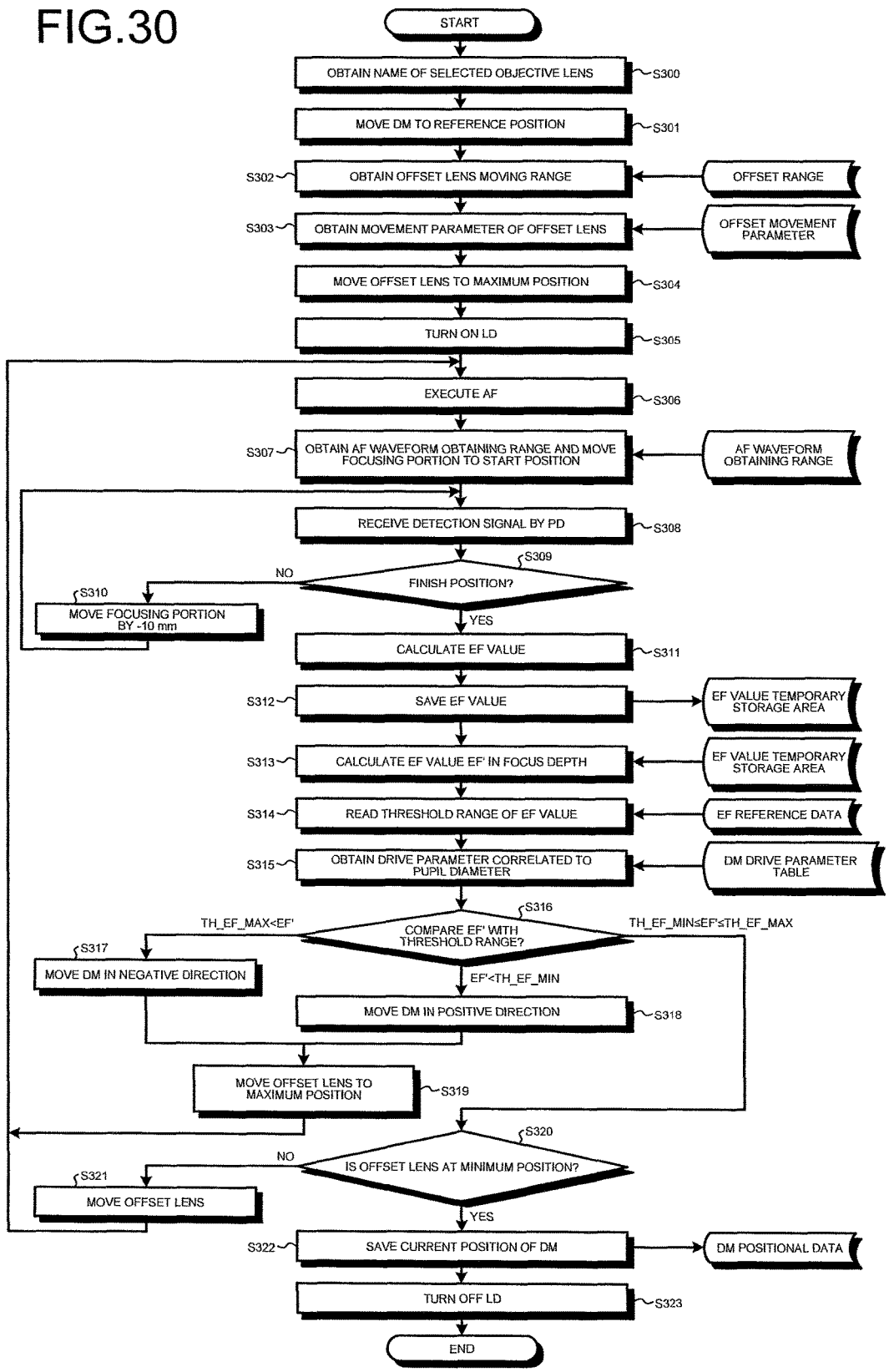
FIG. 30 is a flowchart illustrating a processing procedure performed by the control unit illustrated in FIG. 28 in order to obtain an arrangement position of a DM in the observation light path according to each of the objective lenses.
Figure 31:
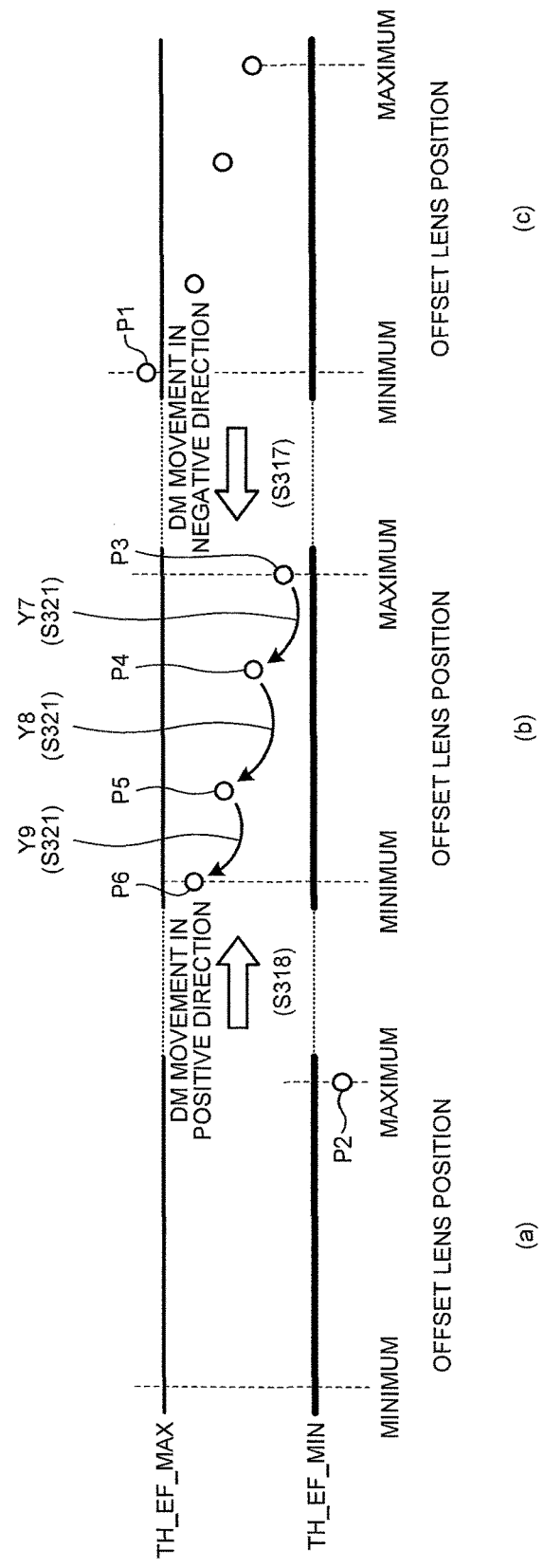
FIG. 31 is an explanatory diagram for the processing procedure in FIG. 30.

FIG. 30 is a flowchart illustrating a processing procedure performed by the controller 224 in order to obtain the arrangement position of the DM 11 on the observation light path in accordance with each objective lens. FIG. 31 is an explanatory diagram for the processing procedure in FIG. 30.

Step S300 in FIG. 30 corresponds to Step S200 in FIG. 20. The controller 224 refers to a DM reference position storage unit 251 and obtains a reference position of the DM 11 correlated to a selected objective lens, and then causes a DM drive control unit 250 to move the DM 11 to the reference position (Step S301). The controller 224 refers to the table T5 of the offset lens moving range storage unit 2257 and obtains the moving range of the offset lens group 9 correlated to the selected objective lens (Step S302), and also obtains a movement parameter including the moving step of the offset lens group 9 correlated to the selected objective lens (Step S303). The offset lens drive control unit 2256 causes the offset lens motor 17 and the offset lens motor drive unit 20 to move the offset lens group 9 to a maximum position of the obtained moving range of the offset lens group 9 (Step S304). Step S305 to Step S312 correspond to Step S202 to Step S209 in FIG. 20, respectively. Step S313 to Step S316 correspond to Step S210-1 to Step S213-1 in FIG. 25, respectively.

In the case where a maximum value of a threshold is TH_EF_MAX and in the case where a determination unit 254 determines that an EF' calculated by an EF value calculation, unit 242 is larger than TH_EF_MAX (Step S316: TH_EF_MAX<EF') (refer to a mark P1 in (c) of FIG. 31), a setting unit 255 sets a moving direction of the DM 11 to a negative direction in accordance with parameters provided in a table T4 same as Step S214-1 illustrated in FIG. 25. Consequently, the DM drive control unit 250 drives the DM motor drive unit 29 and the DM motor 30 to move the DM 11 in the negative direction (Step S317). In this case, same as Step S214 illustrated in FIG. 20, the setting unit 255 moves the DM 11 by the moving step at a moving speed correlated to a pupil diameter of the selected objective lens in accordance with parameters provided in a table T3. After the processing in Step S317, the controller 224 returns to Step S306 and executes processing from the Step S306 after causing the offset lens drive control unit 2256 to move the offset lens group 9 to the maximum position (Step S319) in order to examine whether a position of the newly moved DM 11 is in an arrangement position of the DM 11 on the observation light path.

In the case where a minimum value of a threshold of the EF value is TH_EF_MIN, and in the case where the determination unit 254 determines that the EF' is smaller than TH_EF_MIN (Step S316: EF'<TH_EF_MIN) (refer to a mark 22 in (a) of FIG. 31), the setting unit 255 sets the moving direction of the DM 11 to a positive direction in accordance with the parameters provided in the table T4 similarly to Step S215-1 illustrated in FIG. 25. Consequently, the DM drive control unit 250 drives the DM motor drive unit 29 and the DM motor 30 to move the DM 11 in the positive direction (Step S318). In this case also, same as Step S317, the setting unit 255 moves the DM 11 by the moving step at the moving speed correlated to the pupil diameter of the selected objective lens in accordance with the parameters provided in the table T3. After the processing in Step S318, the controller 224 returns to Step S306 and executes processing from the Step S306 after causing the offset lens drive control unit 2256 to move the offset lens group 9 to the maximum position (Step S319) in order to examine whether a position of the newly moved DM 11 is in the arrangement position of the DM 11 on the observation light path.

If the determination unit 254 determines that EF' is within a threshold range of the EF value, namely, TH_EF_MIN≤EF'≤TH_EF_MAX (Step S316: TH_EF_MIN≤EF'≤TH_EF_MAX) (refer to marks P3 to P5 in (b) of FIG. 32, the controller 224 determines whether the offset lens group 9 is at the minimum position in the moving range of the offset lens group 9 (Step S320).

When the offset lens group 9 is not at the minimum position (Step S320: No), the controller 224 obtains an arrangement position of the DM 11 on the observation light path in a next position of the offset lens group 9. Therefore, the controller 224 returns to Step S306 and executes the processing from Step S306 after causing the offset lens drive control unit 2256 to move the offset lens group 9 in the negative direction (Step S321) (refer to arrows Y7 to Y9 in (b) of FIG. 31). In Step S321, the setting unit 255 sets the moving step of the offset lens in accordance with the selected objective lens as the moving step in the negative direction of the offset lens group 9 in accordance with the parameters provided in the table T5 of the offset lens moving range storage unit 2257.

When the offset lens group 9 is located at the minimum position (Step S320: Yes) (refer to a mark P6 in (b) of FIG. 31), the controller 224 obtains, as the arrangement position of the DM 11 on the observation light path according to the selected objective lens, a current position of the DM 11 in the case where the offset lens group 9 is in the minimum position. The controller 224 stores, in the DM position storage unit 249, the obtained arrangement position of the DM 11 on the observation light path correlated to the selected objective lens (Step S322). In the case where the DM 11 is arranged in this arrangement position of the DM 11 on the observation light path, it can be said that the EF value in the focus depth area calculated by the EF value calculation unit 242 is included inside the predetermined threshold range even in the case where the offset lens group 9 is located in any place within the predetermined moving range. Step S323 corresponds to Step S217 in FIG. 20. The controller 224 obtains the arrangement position of the DM 11 on the observation light path in accordance with each objective lens while adjusting the position of the offset lens group 9 by performing, per objective lens, the respective processing procedures illustrated in FIG. 30.

Figure 32:
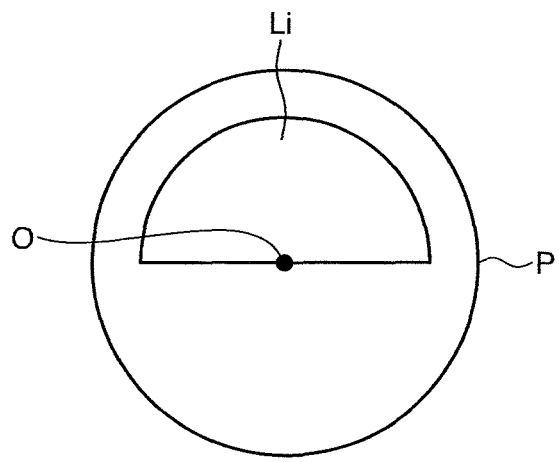
FIG. 32 is an explanatory diagram for entrance of a laser luminous flux that enters an objective lens from the DM in the case where an offset lens group illustrated in FIG. 27 is located at a minimum position.
Figure 33:
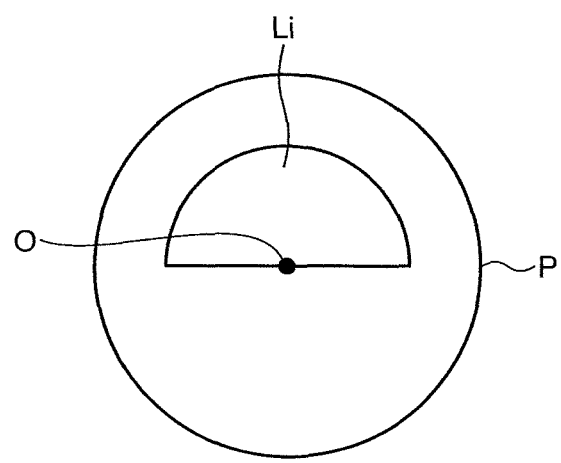
FIG. 33 is an explanatory diagram for entrance of the laser luminous flux that enters the objective lens from the DM in the case where the offset lens group illustrated in FIG. 27 is located at a center position.
Figure 34:
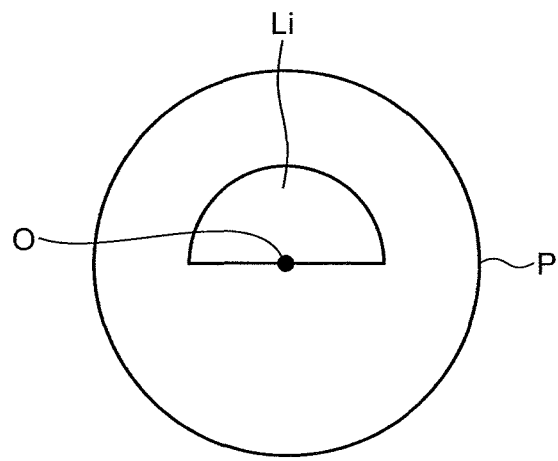
FIG. 34 is an explanatory diagram for entrance of the laser luminous flux that enters the objective lens from the DM in the case where the offset lens group illustrated in FIG. 27 is located at a maximum position.
Figure 35:
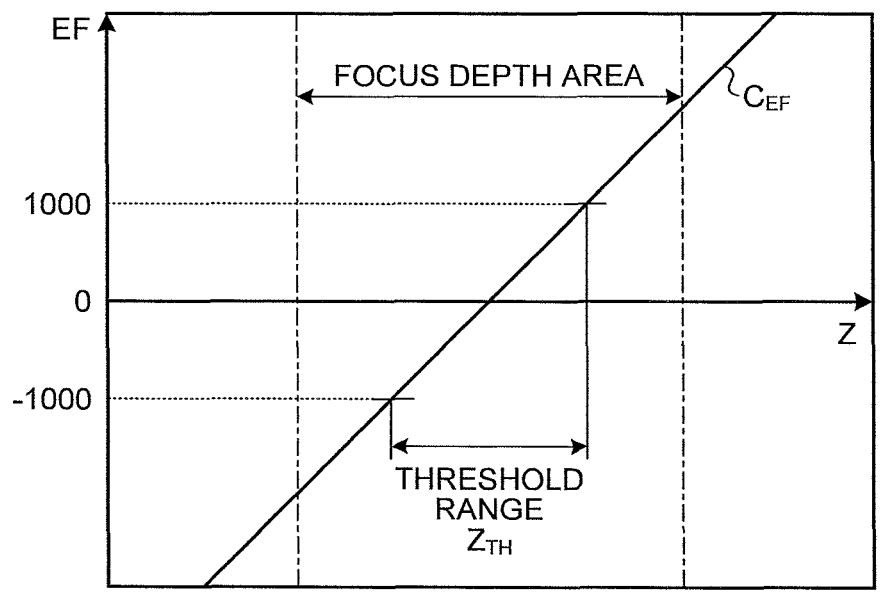
FIG. 35 is a diagram illustrating an exemplary Z-position dependence of an EF value in a focus depth area in the case where the offset lens group is located at the minimum position illustrated in FIG. 27.
Figure 36:
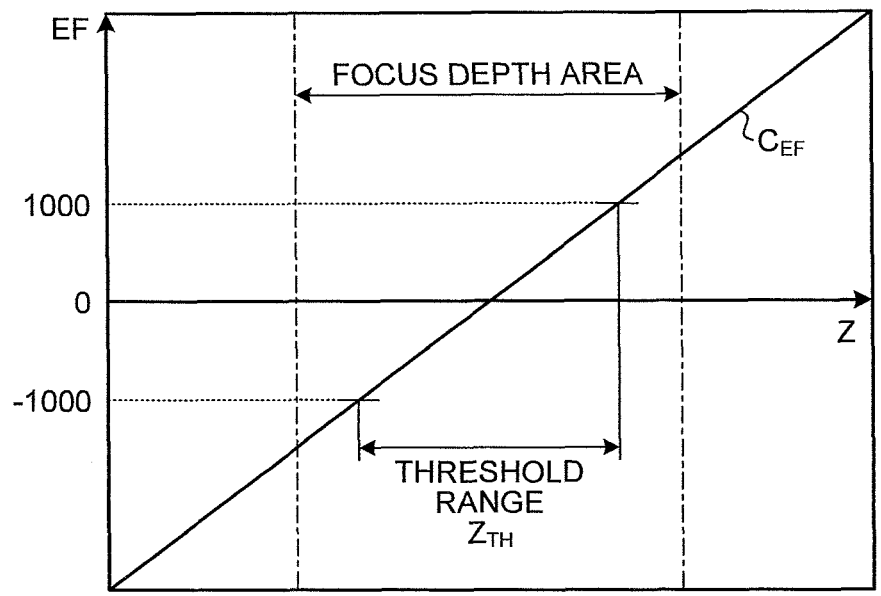
FIG. 36 is a diagram illustrating an exemplary Z-position dependence of the EF value in the focus depth area in the case where the offset lens group is located at the center position illustrated in FIG. 27.
Figure 37:
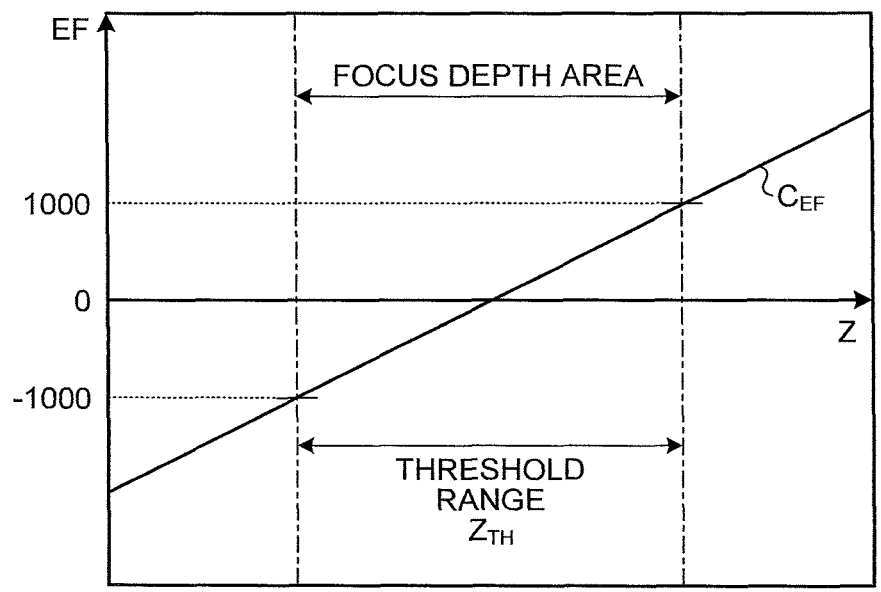
FIG. 37 is a diagram illustrating an exemplary Z-position dependence of the EF value in the focus depth area in the case where the offset lens group is located at the maximum position illustrated in FIG. 27.

FIG. 32 is an explanatory diagram for entrance of a laser luminous flux that enters an objective lens 3a from the DM 11 in the case where the offset lens group 9 is located in the minimum position. FIG. 33 is an explanatory diagram for entrance of the laser luminous flux that enters the objective lens 3a from the DM 11 in the case where the offset lens group 9 is located in a center position. FIG. 34 is an explanatory diagram for entrance of the laser luminous flux that enters the objective lens 3a from the DM 11 in the case where the offset lens group 9 is located in the maximum position. FIG. 35 is a diagram illustrating an exemplary Z-position dependence of the EF value in the focus depth area in the case where the offset lens group is located in the minimum position. FIG. 36 is a diagram illustrating an exemplary Z-position dependence of the EF value in the focus depth area in the case where the offset lens group 9 is located in the center position. FIG. 37 is a diagram illustrating an exemplary Z-position dependence of the IF value in the focus depth area in the case where the offset lens group 9 is located in the maximum position.

As illustrated in FIGS. 32 to 34, a size of an entrance area of the laser luminous flux to the objective lens 3a is varied by the position of the offset lens group 9. In the case where the offset lens group 9 is in the minimum position, the size of the entrance area of the laser luminous flux to the objective lens 3a is largest (refer to FIG. 32). In the case where the offset lens group 9 is in the maximum position, the size of the entrance area of the laser luminous flux to the objective lens 3a is smallest (refer to FIG. 34). As illustrated in FIGS. 35 to 37, relatively, when the size of the entrance area of the laser luminous flux to the objective lens 3a is large, a slope of a line $C_{EF}$ representing the Z-position dependence of the EF value in the focus depth area becomes steeper. Then, when the size of the entrance area of the laser luminous flux to the objective lens 3a is small, the slope of the line $C_{EF}$ representing the Z-position dependence of EF value in the focus depth area becomes gradual. Therefore, as illustrated in FIG. 32, in the case where the offset lens group 9 is in the minimum position which the size of the entrance area of the laser luminous flux to the objective lens 3a is largest, the slope of the line $C_{EF}$ representing the Z-position dependence of the EF value in the focus depth area becomes steeper, and the threshold range $Z_{TH}$ for making focus determination may become a very narrow range.

In the second embodiment, no matter at which position inside the predetermined, moving range the offset lens group 9 is located, the arrangement position of the DM 11 on the observation light path is set such that the EF value in the focus depth area calculated by the EF value calculation unit 242 becomes within the predetermined threshold range. Therefore, the threshold range $Z_{TH}$ for making focus determination can be kept in an appropriate range. In other words, in the second embodiment, even when the offset lens group 9 is located in the minimum position as illustrated in FIG. 32, the arrangement position of the DM 11 on the observation light path is set as described, above. As a result, the threshold range $Z_{TH}$ is appropriately set so as to enable convergence of focus determination.

Moreover, in the second embodiment, the moving step of the offset lens group 9 is set per objective lens correlated to the pupil diameter of the objective lens in the processing to obtain the arrangement position of the DM 11 illustrated in FIG. 30. Furthermore, the moving step of the DM 11 is also set per objective lens correlated to the pupil diameter of the objective lens same as a first embodiment. Therefore, the controller 224 determines the arrangement position of the DM 11 on the observation light path while moving the offset lens group 9 and the DM 11 by each moving width correlated to the pupil diameter of the objective lens. As a result, position adjustment of the DM 11 can be properly performed in accordance with the pupil diameter of the objective lens.

Therefore, in the second embodiment, the controller 224 obtains an optimized arrangement position of the DM 11 on the observation light path in accordance with each objective lens also in consideration of the position of the offset lens group 9, and at the time of actual observation, the DM 11 is moved to this arrangement position on the observation light path. Consequently, variations caused by the position of the offset lens group 9 can be cancelled, and therefore, stable AF performance can be provided even at the time of a continuous AF mode.

In the second embodiment, the controller 224 adjusts the arrangement position of the DM 11 on the observation light path relative to the inserting direction of the DM 11. However, the controller 224 may also have a function to correct the arrangement position of the DM 11 on the observation light path relative to a direction vertical to the inserting direction of the DM 11.

An operation program for each processing executed under the control units 24, 224 of the microscope systems according to the first and second embodiments may be provided by being recorded in computer-readable storage media such as a CD-ROM, a flexible disk, a CD-R, and a DVD in an installable file form or an executable file form, and also may be provided by being stored on a computer connected to a network such as the Internet and then be downloaded via the network.

According to some embodiments, the dichroic mirror and the dichroic mirror drive unit are provided in the automatic focus unit, and the dichroic mirror is moved to the arrangement position on the observation light path which is preliminarily correlated to the objective lens that is arranged in such a manner that the optical axis is aligned with the observation light path of the microscope main body. With this structure, it is possible to avoid deviation between the light path of the infrared light for automatic focus processing in the automatic focus unit and the optical axis of the microscope main body. It is possible to optimize automatic focus performance in accordance with the objective lens.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
a microscope main body including:
a plurality of objective lenses held by a revolver body, the revolver body being rotatable to align an optical axis of an objective lens, from among of the plurality of the objective lenses, with an observation light path of the microscope main body;
a stage for holding an observation object; and
a focusing motor drivable to change a distance between the stage and the objective lens in a direction along the observation light path;
an automatic focus unit including:
a light source configured to emit detection light having a non-visible light component for automatic focus processing;
a dichroic mirror arranged so as to be insertable on and removable from the observation light path and configured to reflect the detection light emitted from the light source in a direction of the optical axis of the objective lens while transmitting visible light;
a dichroic mirror motor drivable to move a position of the dichroic mirror; and
a photo-detector configured to receive the detection light reflected from the observation object via the objective lens; and
a storage storing predetermined data in which each of arrangement positions of the dichroic mirror on the observation light path is correlated with a respective one of the plurality of objective lenses, the predetermined data being information for correcting a position of the dichroic mirror in a direction orthogonal to the optical axis of the objective lens with respect to a predetermined reference position of the dichroic mirror,
wherein the microscope main body further includes a processor which, under control of a stored program, is configured to perform processes comprising:
a dichroic mirror movement control process to control the dichroic mirror motor to move the dichroic mirror to an arrangement position of the dichroic mirror on the observation light path that is correlated to the objective lens, based on the predetermined data stored in the storage, before the automatic focus processing; and
a focusing drive control process to control the focusing motor so as to focus on the observation object based on a result of light reception by the photo-detector.

2. The microscope system according to claim 1, wherein:
a light receiving area of the photo-detector is divided into a first segment and a second segment by an optical axis of the detection light, and
the processor obtains, as the arrangement position of the dichroic mirror on the observation light path for each objective lens, a position of the dichroic mirror where an EF value in a focus depth area on the optical axis of the objective lens is within a predetermined threshold range, the EF value having been calculated based on a result of light reception by the photo-detector in the automatic focus processing executed to obtain the arrangement position of the dichroic mirror, and the EF value being calculated by $(Q_A-Q_B)/(Q_A+Q_B)$, where $Q_A$ is a detection signal output from the first segment of the photo-detector, and $Q_B$ is a detection signal output from the second segment of the photo-detector.

3. The microscope system according to claim 2, wherein the processor, under control of the stored program, is further configured to perform processes comprising:
an automatic focus control process to control execution of the automatic focus processing;
an EF value calculation process to calculate the EF value in the focus depth area each time the automatic focus processing is executed; and
a determination process to determine whether the EF value in the focus depth area calculated in the EF value calculation process is within the threshold range,
wherein the dichroic mirror movement control process controls the dichroic mirror motor to sequentially move the dichroic mirror from the predetermined reference position by a moving width determined for each objective lens,
wherein the automatic focus control process controls the microscope main body and the automatic focus unit so as to respectively execute the automatic focus processing at each position of the dichroic mirror, and
wherein the processor obtains, as the arrangement position of the dichroic mirror on the observation light path, a position of the dichroic mirror where the determination process determines that the EF value is within the threshold range.

4. The microscope system according to claim 3, wherein the processor, under control of the stored program, is further configured to perform a setting process to set a moving direction of the dichroic mirror based on a comparison between the EF value and the threshold range if it is determined in the determination process that the EF value is out of the threshold range.

5. The microscope system according to claim 3, wherein the moving width of the dichroic mirror is determined, for each objective lens, corresponding to a pupil diameter of the objective lens.

6. The microscope system according to claim 3, wherein:
the EF value calculation process calculates plural EF values, each of the plural EF values being calculated with the stage at a respective different predetermined position along the optical axis of the objective lens, calculates an approximate line from the plural EF values using a least squares method, and based on the approximate line, calculates a slope of the EF value in the focus depth area relative to the optical axis of the objective lens,
the determination process determines whether the slope is equal to a reference value, and
the processor obtains, as the arrangement position of the dichroic mirror on the observation light path, a position of the dichroic mirror where the determination process determines that the slope is equal to the reference value.

7. The microscope system according to claim 6, wherein the processor, under control of the stored program, is further configured to perform a setting process to set a moving direction of the dichroic mirror based on a comparison between the slope and the reference value if it is determined in the determination process that the slope differs from the reference value.

\* \* \* \* \*